(12) United States Patent
Schoner et al.

(10) Patent No.: US 8,842,741 B2
(45) Date of Patent: Sep. 23, 2014

(54) METHOD AND SYSTEM FOR DIGITAL NOISE REDUCTION OF SCALED COMPRESSED VIDEO PICTURES

(75) Inventors: Brian Schoner, Fremont, CA (US);
Jaewon Shin, Santa Clara, CA (US);
Olivier Francois Joseph Harel, Mountain View, CA (US); Advait Madhav Mogre, Sunnyvale, CA (US);
Hyeong-Seok Victor Ha, North York (CA)

(73) Assignee: Broadcom Corporation, Irvine, CA (US)

( * ) Notice: Subject to any disclaimer, the term of this patent is extended or adjusted under 35 U.S.C. 154(b) by 542 days.

(21) Appl. No.: 12/975,977

(22) Filed: Dec. 22, 2010

(65) Prior Publication Data

US 2012/0162525 A1 Jun. 28, 2012

(51) Int. Cl.
*H04N 5/00* (2011.01)
*H04N 19/86* (2014.01)
(52) U.S. Cl.
CPC .............................. *H04N 19/00909* (2013.01)
USPC .................................................... 375/240.27
(58) Field of Classification Search
CPC .. H04N 19/00909; H04N 13/00; H04N 19/00
USPC ......................................................... 375/240
See application file for complete search history.

(56) References Cited

U.S. PATENT DOCUMENTS

| | | | | |
|---|---|---|---|---|
| 4,039,829 | A * | 8/1977 | Kato et al. | 250/306 |
| 7,031,546 | B2 * | 4/2006 | Maeda et al. | 382/260 |
| 7,813,425 | B2 * | 10/2010 | Xie | 375/240.01 |
| 2005/0057673 | A1 * | 3/2005 | Shimomura et al. | 348/294 |
| 2006/0171467 | A1 * | 8/2006 | Schoner | 375/240.24 |

* cited by examiner

*Primary Examiner* — Dave Czekaj
*Assistant Examiner* — MD Haque
(74) *Attorney, Agent, or Firm* — Foley & Lardner LLP

(57) ABSTRACT

In a video processing device, scale of a video image is detected for vertical and horizontal directions based on pixel information, for example, per pixel vertical and horizontal gradients. Gradients are utilized or discarded based on picture format, standard deviation of luma levels and pixel location relative to black border edges, graphics and/or overlaid content. Mosquito noise filters are adapted based on scale and/or noise strength. Median and/or linear filter results are selected based on a weakest, a strongest and/or a blended result. Horizontal and vertical operations are performed separately for edge detection, edge strength determination, filtering and filter correction control. Horizontal and vertical block grid spacing and grid shift are determined. Block noise strength is determined. Block noise filters are configured based on scaling and/or noise strength. Filter corrections are limited based on block noise strength. Noise reduction results may be blended to generate a pixel correction value.

18 Claims, 24 Drawing Sheets

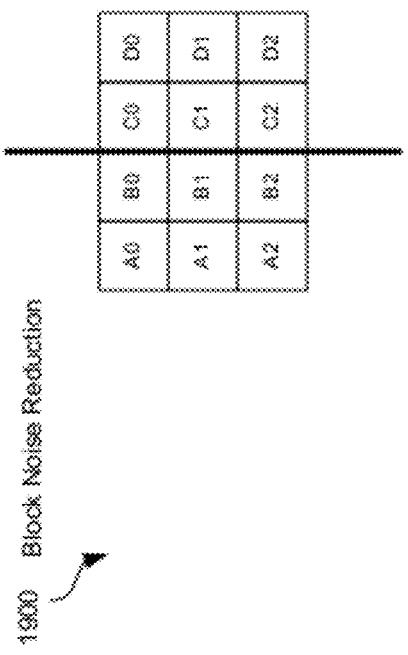
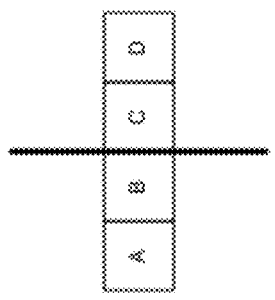
FIG. 19A
FIG. 19B
1900 Block Noise Reduction

METHOD AND SYSTEM FOR DIGITAL NOISE REDUCTION OF SCALED COMPRESSED VIDEO PICTURES

CROSS-REFERENCE TO RELATED APPLICATIONS/INCORPORATION BY REFERENCE

This application makes reference to:
U.S. patent application Ser. No. 11/087,491 filed Mar. 22, 2005;
U.S. patent application Ser. No. 11/083,597 filed Mar. 18, 2005;
U.S. patent application Ser. No. 11/090,642 which was filed on Mar. 25, 2005;
U.S. patent application Ser. No. 11/089,788 which was filed on Mar. 25, 2005; and
U.S. patent application Ser. No. 11/491,599 which was filed on Jul. 24, 2006.

Each of the above stated applications is hereby incorporated herein by reference in its entirety.

FIELD OF THE INVENTION

Certain embodiments of the invention relate to communication systems. More specifically, certain embodiments of the invention relate to digital noise reduction of scaled compressed video pictures.

BACKGROUND OF THE INVENTION

Advances in compression techniques for audio-visual information have resulted in cost effective and widespread recording, storage, and/or transfer of movies, video, and/or music content over a wide range of media. The Moving Picture Experts Group (MPEG) family of standards is among the most commonly used digital compressed formats. A major advantage of MPEG compared to other video and audio coding formats is that MPEG-generated files tend to be much smaller for the same quality. This is because MPEG uses very sophisticated compression techniques. However, MPEG compression may be lossy and, in some instances, it may distort the video content. In this regard, the more the video is compressed, that is, the higher the compression ratio, the less the reconstructed video resembles the original information. Some examples of MPEG video distortion are a loss of texture, detail, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is the area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. In this regard, operations that are utilized to reduce compression-based blur are generally called image enhancement operations. When MPEG video compression results in added distortion on the video image it is said to produce "artifacts" on the video image. For example, the term "mosquito noise" may refer to MPEG artifacts that may be caused by the quantization of high spatial frequency components in the image. Mosquito noise may also be referred to as "ringing" or "Gibb's effect." In another example, the term "block noise" may refer to MPEG artifacts that may be caused by the quantization of low spatial frequency information in the image. Block noise may appear as edges on 8×8 blocks and may give the appearance of a mosaic or tiling pattern on the video image.

Mosquito noise commonly appears near sharp luma edges, making credits, text, and/or cartoons particularly susceptible to this form of artifact. Mosquito noise may be more common, and generally more severe, at low bit rates. For example, mosquito noise may be more severe when macroblocks are coded with a higher quantization scale and/or on a larger quantization matrix.

Mosquito noise may tend to appear as very high spatial frequencies within the processing block. In some instances, when the input video to the MPEG compression operation has any motion, the mosquito noise generated may tend to vary rapidly and/or randomly resulting in flickering noise. Flickering noise may be particularly objectionable to a viewer of the decompressed video image. In other instances, when the input video to the MPEG compression operation is constant, the mosquito noise that results is generally constant as well. Horizontal edges tend to generate horizontal ringing while vertical edges tend to generate vertical ringing. While mosquito noise may also occur in the color components or chroma of a video image, it may generally be less of a problem since it is less objectionable to a viewer of the decompressed video image.

Block noise may generally occur near a block boundary. While block noise may occur anywhere on an image, it is more commonly seen in nearly smooth regions, such as the sky and faces, or in high motion or high variance regions, such as moving water. Block noise may be more common, and generally more severe, at low bit rates. For example, block noise may be more severe when macroblocks are coded with a higher quantization scale and/or on a larger quantization matrix. While block noise is typically caused by quantization of low spatial frequency terms that result from the DCT operation, it is not generally caused by the quantization of the DC term. For example, MPEG compression generally provides at least 8 bits when quantizing the DC term of intra coded blocks.

Block noise may also appear at discontinuities located at or near the block edges. The block boundaries may remain fixed even when the video image moves. In this regard, a static block pattern may stand out strongly against a moving background, a condition that may be highly objectionable from a viewer's perspective. In some instances, however, motion vectors generated during MPEG compression may cause block noise to move with the video image, but this is generally less common and less objectionable from a viewer's perspective. Block noise may be more objectionable on vertical edges than on horizontal edges, particularly on an interlaced display.

Block noise may generally be more pronounced in certain picture coding types. For example, block noise may be often worse in intra coded pictures or I-pictures and in predicted pictures or P-pictures. While block noise is generally associated with the luma component of a video image, it may also occur in the chroma component of a video image. However, the block noise in the chroma component may generally be less of a problem since it is less objectionable to a viewer of the decompressed video image.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for digital noise reduction of scaled compressed video pictures.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 19A illustrates an exemplary image portion for vertical edge detection, in accordance with an embodiment of the invention.

FIG. 19B illustrates an exemplary notation that may be utilized for vertical edge filtering, in accordance with an embodiment of the invention.

DETAILED DESCRIPTION OF THE INVENTION

Figure 1:
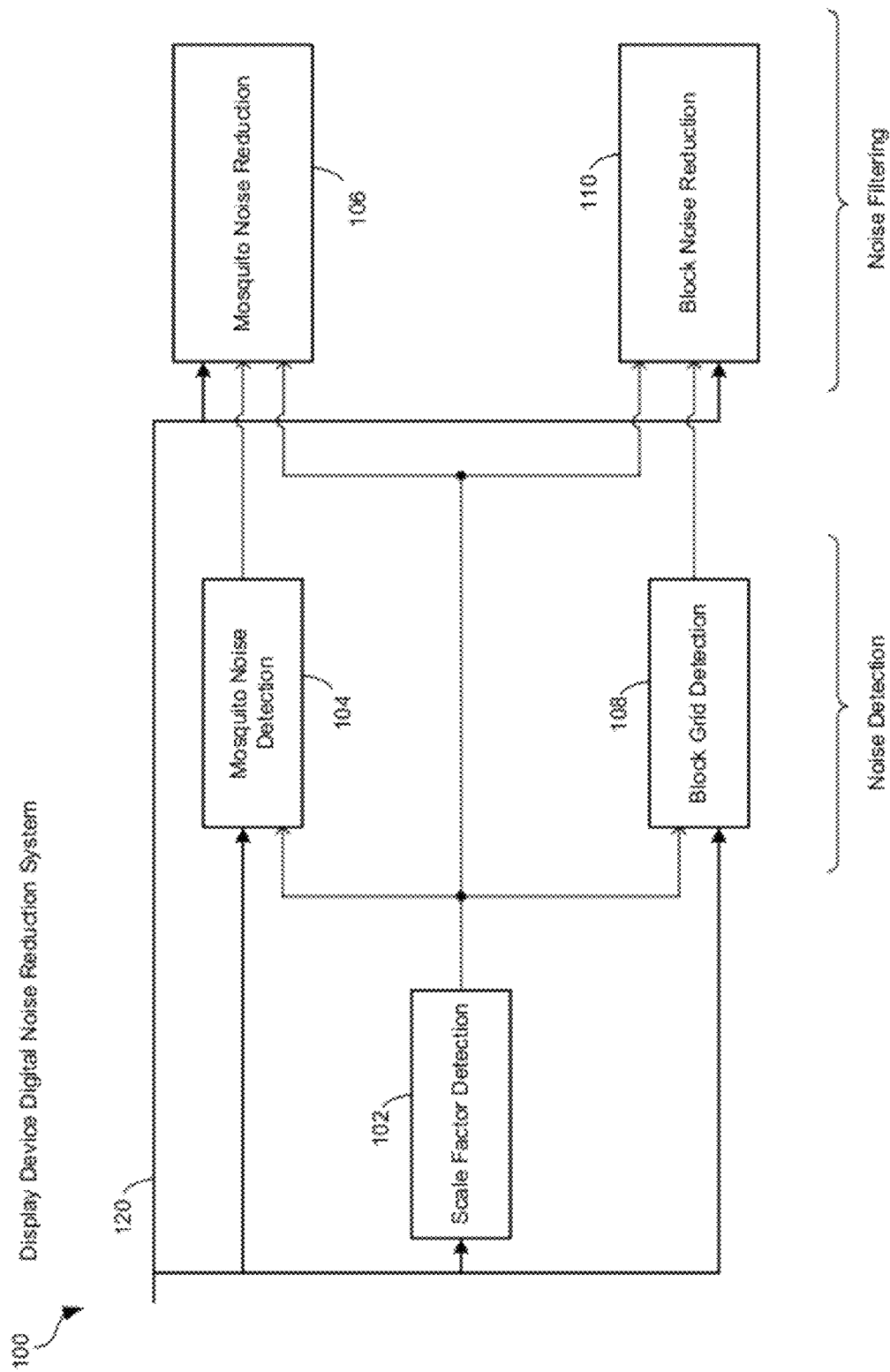
FIG. 1 is a block diagram that illustrates exemplary functions in a system which performs digital noise reduction (DNR) of video pictures utilizing scale factor detection information.

Certain embodiments of the invention can be found in a method and system for digital noise reduction of scaled compressed video pictures. In accordance with various embodiments of the invention, in a video processing device, scale may be detected in a video image. The scale may be detected in one or both of vertical direction and horizontal direction based on pixel information for the video image. One or both of a first video noise reduction operation and a second video noise reduction operation which are utilized for processing at least a portion of the video image, may be controlled based on the detected scale. A pixel correction value may be generated based on one or both of results from the first video noise reduction operation and results from the second video noise reduction operation. The results from the first video noise reduction operation and the results from the second video noise reduction operation may be blended to generate the pixel correction value. At least one pixel value may be corrected for the video image utilizing the generated pixel correction value. The first video noise reduction operation and the second video noise reduction operation may comprise mosquito noise reduction and block noise reduction. The scale may be determined based one or both of a per pixel vertical gradient measurement and a per pixel horizontal gradient measurement. Which gradient measurements to utilize and/or which gradient measurements to discard, may be determined based on one or more of the following: configured picture format information associated with the video image, standard deviation of luma levels in one or both of a vertical window and a horizontal window about a current pixel of said video image, and a current pixel location relative to edges of black borders, graphics and/or overlaid content associated with said video image. During one or both of the first video noise reduction operation and the second video noise reduction operation, horizontal operations which may correspond to the horizontal direction may be performed separately from vertical operations which may correspond to the vertical direction. The video noise operations may comprise: detecting horizontal and vertical edges, determining strength of horizontal and vertical edges, filtering horizontal and vertical edges and controlling the amount of horizontal filtering and the amount of vertical filtering. For example, horizontal filtering and/or vertical filtering may be adapted based on the determined horizontal direction scale and/or the determined vertical direction scale. Furthermore, the horizontal and/or vertical filtering may be adapted based on the determined strength of the horizontal and the vertical edges.

Results from one or both of the first video noise reduction operation and the second video noise reduction operation may be determined based on one or more of: selecting a weakest filter correction from a median filter and one or more linear filters, blending filter corrections from a median filter and one or more linear filters and selecting a strongest filter correction from a median filter and one or more linear filters. Horizontal spacing of a block noise grid, vertical spacing of a block noise grid, horizontal shift of a block noise grid, vertical shift of a block noise grid and/or block noise strength may be determined during one or both of the first video noise reduction operation and the second video noise reduction operation. Determination of which pixels to filter in a picture, may be based on one or more of the horizontal spacing, the vertical spacing, the horizontal shift and the vertical shift. Vertical and/or horizontal block noise filters may be configured based on one or more of the horizontal direction scale, the vertical direction scale, the horizontal spacing and the vertical spacing. Filter corrections may be limited based on block noise strength when determining the results from the first video noise reduction operation and/or the results from the second video noise reduction operation. In this manner, digital noise may be reduced in scaled compressed video pictures, for example, when video pictures are scaled after being compressed.

FIG. 1 is a block diagram that illustrates exemplary functions in a system which performs digital noise reduction (DNR) of video pictures utilizing scale factor detection information, in accordance with an embodiment of the invention. Referring to FIG. 1, there is shown, a video display device digital noise reduction system 100 which comprises a video input 120, a scale factor detection unit 102, a mosquito noise detection unit 104, a block grid detection unit 108, a mosquito noise reduction unit 106 and a block noise reduction unit 110.

The video display device digital noise reduction system 100 may be integrated in a video display device or digital television, for example. The video display device digital noise reduction system 100 may be operable to receive the video input 120 from, for example, a set top box or disk device such as a Blue-ray device. The video input 120 may comprise a sequence and/or stream of decoded video data. The video input 120 may comprise pictures or images that may, for example, comprise progressive frames, interlaced fields and or converted pictures. For simplicity, a field and/or a frame may sometimes be referred to as a picture or an image. The following discussion will generally use the terms "image" and "picture" interchangeably. Accordingly, notions of a difference between the terms "image" and "picture" should not limit the scope of various aspects of the present invention. The video input 120 may or may not be spatially scaled. Scaling may change the size of a picture in one or both of the horizontal direction (x) and the vertical direction (y). When video input 120 is not scaled, it may be referred to as native content or as comprising a native resolution.

Digital noise reduction (DNR) may be utilized to reduce noise artifacts, and may comprise removing mosquito noise (MN) block noise (BN) and contours. Noise artifacts may comprise added distortion, for example, ringing, while blurring may comprise a visual loss of detail.

The video input 120 may have been compressed utilizing transform encoding by a video source and may have been decompressed by a video processing device such as, for example, a set top box or digital television, prior to being sent to the video display device digital noise reduction system 100. For example, the video input 120 may have been compressed or encoded utilizing MPEG 2 where 8×8 blocks of pixels undergo discreet cosine transforms (DCT). The image and/or video transform encoding may introduce ringing artifacts on edges within a video picture. Also, block noise may be introduced along transform block boundaries. When the video input 120 pictures are decompressed, various digital noise artifacts such as, for example, block grid noise and mosquito noise may be found in all or a portion of a video picture.

Video input 120 pictures may have been scaled prior to compression coding, subsequent to compression coding and/or subsequent to decompression. In instances when scaling is performed prior to compression or when video is not scaled, digital noise such as block grid noise and mosquito noise may not be scaled up or down with the video content. The location and/or frequency spectrum of the noise may be somewhat predictable in that it may occur according to a known 8×8 DCT block pattern, for example. However, in instances when picture scaling is performed subsequent to compression and/or subsequent to decompression, an 8×8 block noise pattern and other noise components may be scaled along with the content of the video input 120. As a result, location and/or frequency spectrum of digital noise such as block grid noise and/or mosquito noise may be unknown in the video input 120. Detecting a scale factor in the received video input 120 may improve the efficacy of digital noise detection and digital noise reduction.

The scale factor detection unit (SFD) 102 comprises suitable logic, circuitry, interfaces and/or code that may be operable to receive the video input 120 and detect whether the video input 120 has been scaled. The SFD 102 may be operable to determine a scale factor for one or more pictures in the video input 120. The scale factor may be communicated to the mosquito noise detection unit 104; the block grid detection unit 108, the mosquito noise reduction unit 106 and/or the block noise reduction unit 110. The SFD 102 may be operable to determine the scale factor based on gradients that are determined with respect to luma pixel values and/or in various embodiments of the invention, with respect to chroma pixel levels. Furthermore, the SFD 102 may be operable exclude certain picture content from gradient analysis in instances when sharp edges in the content itself would yield large gradient values which may be misleading. For example, picture areas comprising high frequency content such as superimposed graphics, subtitles, and black borders which may comprise letter box, pillar box and poster stamp borders, may be flagged and gradient analysis may be excluded in these regions.

The mosquito noise detection unit (MND) 104 may comprise suitable logic, circuitry, interfaces and/or code that may be operable to estimate mosquito noise strength of a current picture in the video input 120. Output from the MND 104 may be utilized to adapt mosquito noise reduction (MNR) filters to varying qualities of pictures within the input video 120. In this regard, MNR filters may be adjusted or selected to handle different amounts of mosquito noise in pictures of the video input 120. Mosquito noise strength estimation (MNSE) in the MND 104 may be based on mosquito noise filtering. In some instances various logic, circuitry, interfaces and/or code that may be operable to perform mosquito noise filtering, may also be utilized for MNSE. The MND 104 may estimate the amount of mosquito noise in a picture by determining an amount of filtering that may be applied to all or a portion of the picture. The MND 104 may then normalize the amount of filtering based on a sum of edge strength that may be determined for the entire picture, for example, to determine the MNSE.

The mosquito noise reduction unit (MNR) 106 may comprise suitable logic, circuitry, interfaces and/or code that may be operable to perform separate noise detection for horizontal and vertical edges within pictures of the video input 120. In this regard, the vertical edges of mosquito noise may tend to propagate horizontally and the horizontal edges may tend to propagate vertically. The MNR unit 106 may also be operable to perform separate horizontal and vertical filtering where the amount of filtering may be controlled based on the separate horizontal and vertical mosquito noise detection. The MNR unit 106 may be operable to select from a plurality of filter types such as median filters and linear low pass filters for reducing the horizontal and/or the vertical noise components. In this regard, the MNR unit 106 may apply a reduced or minimal amount of filtering to the video input 120, depending on picture content and/or noise characteristics. For example, median filters may work better in areas with sharp edges in video content where linear low pass filters may tend to blur the content. In areas of high frequency patterns and/or smooth surfaces, linear low pass filters may work best while median filters may invert some high frequency patterns or may cause contouring on smooth surfaces. The MNR unit 106 may apply both filters to the video content 120 and may utilize the one that resulted in the least filtering. The MNR unit 106 may be operable to adjust to the size of a filter, for example, the size of the MNR filters may be programmable. In this regard, the number of horizontal and vertical taps and/or coefficients may vary depending on the size and/or scale factor of the video input 120.

The block grid detection unit (BGD) 108 may comprise suitable logic, circuitry, interfaces and/or code that may be operable to estimate the location of grid lines associated with block noise and assess the strength of the block grid in the video input 120. For example, a block grid size which may comprise the distance between two consecutive block boundaries may be determined for the vertical direction and also for the horizontal direction in a video picture. Also, a block grid shift value or phase may be determined which may comprise an offset of the first horizontal grid edge from the top of the picture and an offset of the first vertical edge from the left of the picture. In addition, a per picture measurement of block noise strength may be determined for each horizontal and/or vertical direction in a picture. The block grid detection unit 108 may be operable to handle any suitable block size and/or shift value and may not know scaling values of the input video 120. The determined block grid localization and strength information may be may be communicated to the block noise reduction unit 110 for filtering of the block noise. The block grid detection output may be utilized to determine an amount of filtering to apply to video content. Block noise may be present in all or a portion of a picture.

The block grid reduction unit 110 may comprise suitable logic, circuitry, interfaces and/or code that may be operable to detect block edges on the block grid of a picture and filter the edges appropriately. The block grid reduction unit 110 may be operable to determine limits that may be utilized to control block noise filtering. For example, in instances when a strong edge is found, a large limit may allow strong filtering. In instances when no edge is found, a zero limit may disable filtering. The block grid reduction unit 110 may utilize horizontal and vertical markers from the block grid detection unit 108 when detecting edges in pictures of the video input 120.

In various embodiments of the invention, the noise detection units, for example, the MND 104 and/or the BGD 108 may be operable to perform scale factor detection. For example, scale factor analysis by the MND 104 and/or the BGD 108 may be combined with that of the SFD 206 to refine scale factor detection.

In operation, digital picture coding that utilizes block based compression algorithms such as MPEG-2, for example, may introduce block noise and mosquito noise artifacts that may need to be filtered out of a picture. By determining the location and frequency spectrum of the digital noise, 2-D filtering may be adjusted to suppress the noise artifacts with minimal effect to other active regions of video content. In instances when an image has been scaled up, subsequent filtering of block and/or mosquito noise may be affected. For example, when video data is encoded prior to up scaling and/or de-interlacing, the scaling will affect the source data as well as the block noise and mosquito noise artifacts. In this regard, frequency spectrum of the noise artifacts and gradients determined for an image may be reduced when the digital noise is scaled up. Digital filters may be adjusted to mitigate the lower frequency, scaled noise artifacts.

Figure 2:
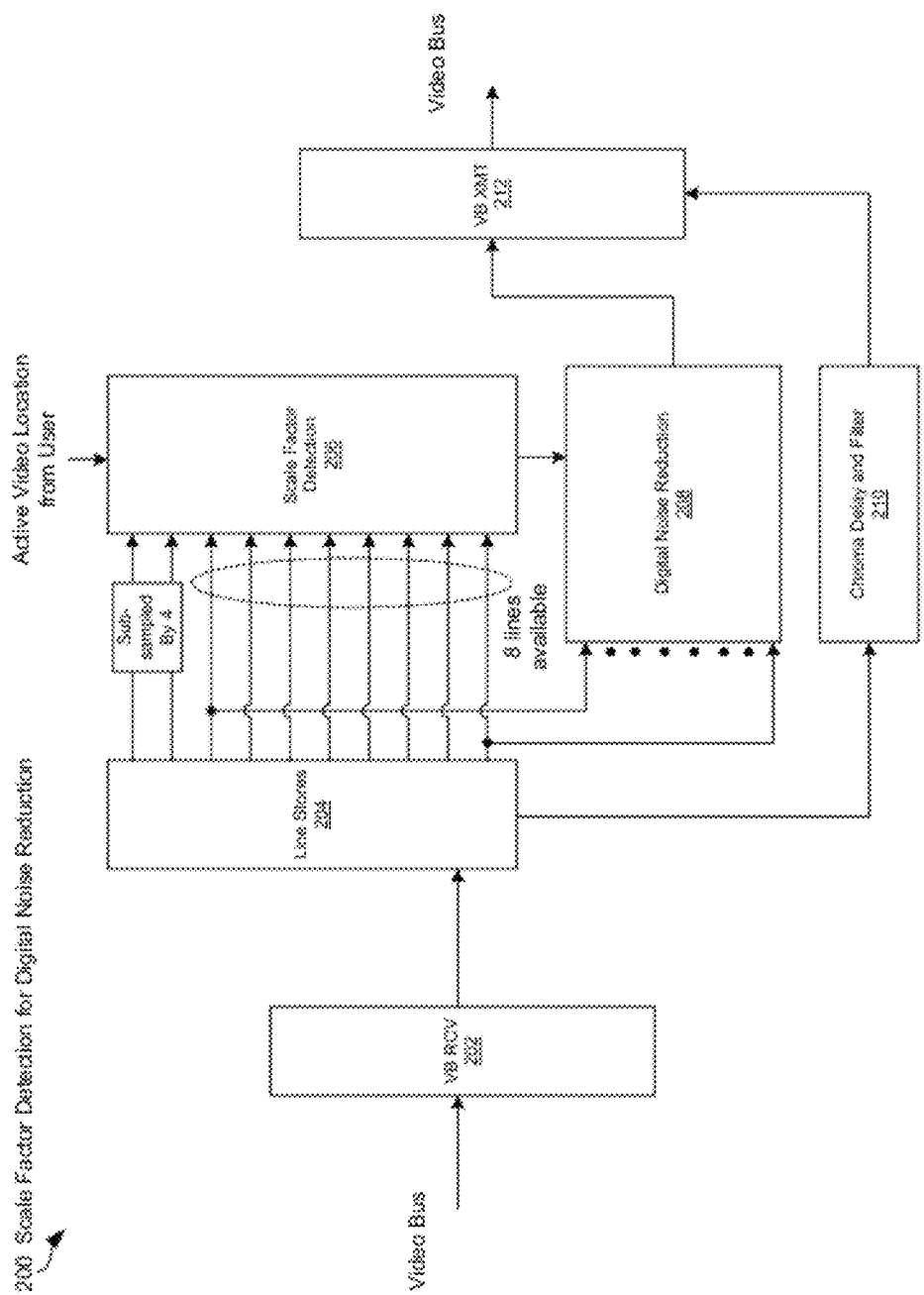
FIG. 2 is a block diagram that illustrates an exemplary scale factor detector in a digital noise reduction system, in accordance with an embodiment of the invention.

FIG. 2 is a block diagram that illustrates an exemplary scale factor detector in a digital noise reduction system, in accordance with an embodiment of the invention. Referring to FIG. 2, there is shown, a digital noise reduction system 200 comprising a video bus receiver 202, line stores 204, a scale factor detection unit (SFD) 206, a digital noise reduction (DNR) unit 208, a chroma delay and filter 210, and a video bus transmitter 212.

The video bus receiver (VB RCV) 202 may comprise suitable logic, circuitry, interfaces and/or code that may be operable to receive MPEG-coded and/or decoded images in a format that is in accordance with bus protocol. The VB RCV 202 may also be adapted to convert the received MPEG-coded and/or decoded video images into a different format for transfer to the line stores 204.

The line stores 204 may comprise suitable logic, circuitry, interfaces and/or code that may be adapted to convert raster-scanned luma data from a current MPEG-coded video image into parallel lines of luma data. The line stores block 204 may be adapted to operate in a high definition (HD) mode or in a standard definition (SD) mode. Moreover, the line stores block 204 may also be adapted to convert and delay-match the raster-scanned chroma information into a single parallel line.

The SFD 206 may be similar and/or substantially the same as the SFD 102 shown in FIG. 1. The SFD 206 may comprise suitable logic, circuitry, interfaces and/or code that may be operable to receive lines of pixels from the line stores 204 and determine horizontal and/or vertical scale factors for a video picture corresponding to the lines of pixels. In this regard, the SFD 206 may be operable to determine an overall gradient for each video picture and may utilize the overall gradient to determine a scale factor for each video picture. The SFD 206 may communicate the scale factor to the digital noise reduction (DNR) unit 208 to be utilized in noise detection and/or noise reduction.

The DNR unit 208 may comprise suitable logic, circuitry, interfaces and/or code that may be operable to perform mosquito noise strength estimation, mosquito noise reduction, block grid detection and block noise reduction. In this regard, the DNR unit 208 may comprise the mosquito noise detection unit 104, the block grid detection unit 108, the mosquito noise reduction unit 106 and the block noise reduction unit 110 which are described with respect to FIG. 1. The DNR unit 208 may be operable to output noise reduced luma data to the video bus transmitter 212.

The chroma delay and filter 210 may comprise suitable logic, circuitry, interfaces and/or code that may be operable to delay the transfer of chroma pixel information in the chroma data line to the video bus transmitter (VB XMT) 212 to substantially match the time at which the luma data from the digital noise reduction unit 208 is transferred to the VB XMT 212. The VB XMT 212 may comprise suitable logic, circuitry, and/or code that may be adapted to assemble noise-reduced MPEG-coded video images into a format that is in accordance with the bus protocol supported by the VB.

In operation, the digital noise reduction system 200 may utilize luma data to estimate spatial scaling in a pixel domain for video pictures. Scaling may comprise stretching or compressing in either or both of a horizontal (x) direction and a vertical (y) direction. In instances when an image is scaled up in a particular direction, a sharp luma edge along that direction may become less sharp or dull in the corresponding scaled image. Therefore, a measurement of gradient at the edge in the duller scaled picture would result in a lower gradient than in a measurement of gradient for the corresponding sharper edge in the original picture. In this manner, luma gradients may be utilized in the estimation of scale factor.

In an exemplary embodiment of the invention, the VB RCV 202 may be operable to receive MPEG coded and/or decoded video content and may convert the content into a different format for transfer to the line stores 204. The line stores 204 may receive the video content corresponding to a current video picture and may convert raster-scanned luma data from the current picture into parallel lines of luma data. The line stores 204 may communicate the parallel lines to the scale factor detection (SFD) unit 206 and to the digital noise reduction (DNR) unit 208. The line stores block 204 may also convert and delay match raster-scanned chroma information for the current picture into a single parallel line and may communicate the chroma information to the chroma delay and filter unit 210. The SFD unit 206 may determine an overall gradient for the MPEG coded and/or decoded picture and may estimate a scale factor for the picture. The scale factor may be communicated to the DNR 208 to be utilized in digital noise detection and/or digital noise reduction. The DNR unit 208 may process the received video picture lines and may generate a plurality of noise correction parameters. In this regard, the DNR unit 208 may detect mosquito noise strength in horizontal and vertical directions and may determine whether the mosquito noise has been scaled. The DNR unit 208 may determine block grid locations and offsets and may determine whether block noise has been scaled. The mosquito noise and block noise information may be utilized to adjust filtering parameters, for example, filter strength and filter range. Filters may be applied separately in the horizontal and vertical directions and may be controlled based on edge strength in each direction. The DNR unit 208 may apply block noise filters to the video picture pixels and may communicate the filtered video picture to the VB XMT 212 for transmission to the video bus.

Figure 3:
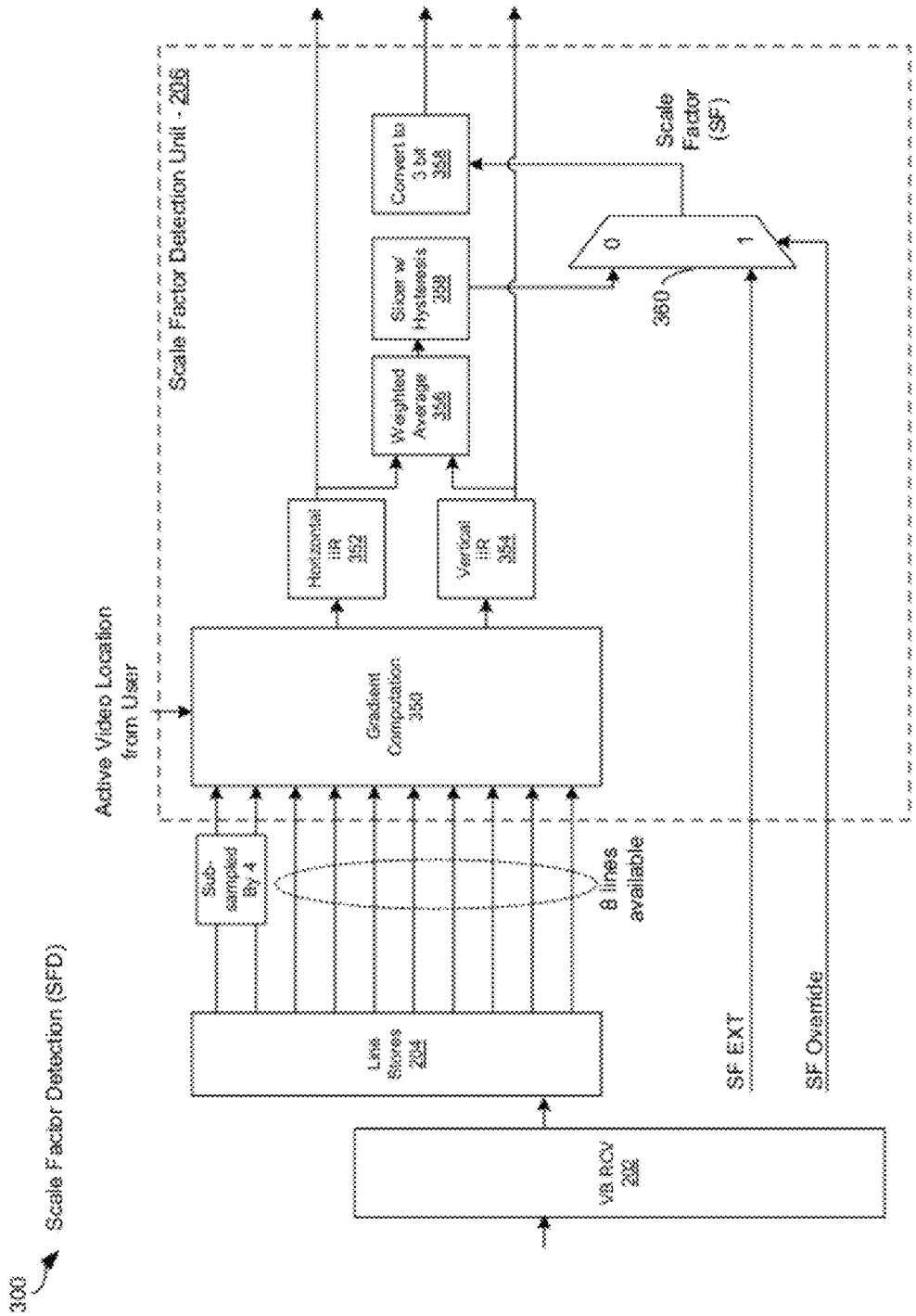
FIG. 3 is a block diagram that illustrates exemplary scale factor detection architecture that is operable to determine scale factor in video pictures that are scaled subsequent to compression and/or decompression, in accordance with an embodiment of the invention.

FIG. 3 is a block diagram that illustrates exemplary scale factor detection architecture that is operable to determine scale factor in video pictures that are scaled subsequent to compression and/or decompression, in accordance with an embodiment of the invention. Referring to FIG. 3, there is shown, the scale factor detection unit (SFD) 206 which may comprise a gradient determination unit 350, a horizontal IIR 352, a vertical IIR 354, a weighted average unit 356, a slicer with hysteresis 358, a convert to 3 bit unit 358 and a scale factor override 360. In addition, there is shown, the video bus receiver (VB RCV) 202, the line stores 204.

The VB RCV 202, the line stores 206 and the SFD 206 are described with respect to FIG. 2 and FIG. 1.

The gradient determination unit 350 may comprise suitable logic, circuitry, interfaces and/or code that may be operable to receive luma pixel information from the line stores 204 and may output an overall scale factor for a video image and/or a sequence of images. The gradient determination unit 350 may be operable to generate basic metrics for horizontal and vertical gradients and may be operable to output the separate horizontal and vertical maximum gradients for a video image. The horizontal and vertical gradient metrics may be utilized in the gradient determination unit 350 to generate a decision as to whether a video picture has been scaled. The horizontal and vertical gradients may also be output for use in digital noise reduction and/or to determine separate horizontal and vertical scale factors for a video image.

The gradient determination unit 350 may utilize luma data to estimate spatial scaling in the pixel domain for video pictures. Scaling may comprise stretching or compressing in either or both of a horizontal (x) direction and a vertical (y) direction. In instances when an image is scaled up in a particular direction, a sharp luma edge along that direction may become less sharp or dull in the corresponding scaled image. Therefore, a measurement of gradient at the edge in the duller scaled picture would result in a lower gradient than a measurement of gradient for the corresponding sharper edge in the original picture. In this manner, luma gradients may be utilized in the detection of scaling and/or estimation of scale factor.

The gradient determination unit 350 may generate a raw maximum vertical gradient and a raw maximum horizontal gradient for an image, on a pixel by pixel basis. The gradient determination unit 350 may select "valid" pixel gradients to be utilized in determination of the maximum gradients and may discard "invalid" pixel gradients in instances when a gradient may not be indicative of scale factor. In an exemplary embodiment of the invention, luma of a current pixel may be denoted by $Y(y, x)$. Luma levels of a vertical window of pixels that is centered about the current pixel may be denoted as $\{Y(y-4), x), Y(y-3, x), \ldots, Y(y, x), \ldots, Y(y+5, x)\}$, where Y represents luma level. Similarly, luma levels of a horizontal window of pixels centered about the current pixel may be denoted as $\{(Y(y, x-5), Y(y, x-4, \ldots, Y(y, x), \ldots, Y(y, x+4)\}$. A luma gradient for the y direction and a luma gradient for the x direction may be determined based on the vertical and horizontal pixel windows respectively. Gradients for the horizontal and vertical directions may be determined in a similar manner. For example, the following steps may be performed to determine a vertical gradient for a current pixel. Similar steps may be performed, utilizing a horizontal window of pixels centered about the current pixel, to determine a corresponding horizontal gradient.

(1) a maximum and a minimum luma value, MAX (Y) and MIN (Y), may be determined over a vertical window of pixels that is centered about the pixel Y(y, x). The pixels may be received from the available line stores 204. In the case of a vertical gradient, the lines may be horizontally sub sampled;

(2) an absolute difference in luma of adjacent pixels may be determined as, for example, |Y(y+1, x)−Y(y, x)|;

(3) a mean luma level and a standard deviation may be determined for a top portion of the vertical window of pixels and a mean luma level and a standard deviation may be determined for the bottom portion of the vertical window of pixels;

(4) the presence of black pixels and/or a black edge that may belong to a superimposed black border or graphics area may be determined and flagged; and (5) a "safe region" may be determined where edges within the safe region are not a result of superimposed borders or graphics and where pixels may be effectively utilized to determine gradient.

In an exemplary embodiment of the invention, a vertical luma gradient for a current pixel at Y(y, x), may be determined as follows:

$$\text{gradient\_y} = \frac{|Y(y+1, x) - Y(y, x)| * 256}{MAX(Y) - MIN(Y) + GRADY\_BIAS\_OUT}$$

$$= \frac{Abs\_diff * 256}{range}$$

The difference between MAX (Y) and MIN (Y) in the denominator may be referred to as the range. The range may be utilized by decision logic as well as in determination of the gradient. The range in the denominator may provide a normalizing factor that may affect how gradual or sharp a luma step change is relative to other pixel levels in the vertical window of pixels. The term GRADY_BIAS_OUT in the denominator may prevent a divide by zero situation, for example, in regions where luma may have a flat value or where a range is very small.

The gradient determination unit 350 may be operable to determine a vertical gradient for a current pixel in the vertical window of pixels, a top standard deviation and bottom standard deviation for the top and bottom portions of pixels in the vertical window of pixels and a black pixel flag for the top and bottom portions of the window of pixels. The gradient determination unit 350 may consider these values as well as one or more previously determined gradients to determine a vertical gradient value for the current pixel and/or to determine whether to discard or retain the vertical gradient for use in determining a maximum vertical gradient for the current video picture.

The gradient determination unit 350 may also retain a running maximum of selected vertical gradients for pixels in a current video picture. The standard deviation information may be utilized to determine whether a gradient should be utilized or discarded when determining the maximum vertical gradient. In this regard, high top and bottom standard deviations may indicate that intense and/or high frequency luma variations may yield such a high gradient that scaled video data may deceptively appear to be at native resolution and/or scaled by a lower scale factor. Similarly, a black pixel flag and/or safe region may be utilized to determine instances when a gradient determined for a current pixel may be uncharacteristically high such that a current gradient may not be utilized in determining the max gradient for the video current video picture. In this regard, a gradient for a current pixel may be excessively high relative to a max gradient determined for the safe region of the current video picture in instances when a vertical window spans the edge of a black border or graphics area.

In various embodiments of the invention, a picture format may stored in memory and may be known to the SFD 206. In this regard, horizontal and vertical gradient limits may be asserted based on the known picture format.

The horizontal IIR 352 and the vertical IIR 354 may comprise suitable logic, circuitry, interfaces and/or code that may be operable to receive the determined maximum horizontal gradients and vertical gradients for a video picture from the gradient determination unit 350 and may smooth the max gradient values over a sequence of video pictures. Outputs from the horizontal IIR 352 and the vertical IIR 354 may be communicated to the weighted average unit 356. The horizontal IIR 352 and the vertical IIR 354 may be updated at the end of each picture or frame based on the current value of the maximum horizontal and vertical gradients over the picture, respectively. Moreover, the outputs from the horizontal IIR 352 and the vertical IIR 354 may be directly output from the SFD 206.

The weighted average unit 356 may comprise suitable logic, circuitry, interfaces and/or code that may be operable to determine an overall average gradient of the horizontal and vertical gradients on a per picture basis utilizing a weighted average, for example. In various embodiments of the invention, the weights may be programmable. Output from the weighted average may be communicated to the slicer with hysteresis unit 358.

The slicer with hysteresis unit 358 may comprise suitable logic, circuitry, interfaces and/or code that may be operable to receive the weighted average gradient values and adjust or convert the gradient values to corresponding quantized levels. For example, gradients that may range between 65 and 245 may be assigned to one of twenty corresponding levels; however, the invention is not limited in this regard. The slicer with hysteresis unit 358 may also consider previous changes in gradient levels relative to a current level and/or relative to a hysteresis threshold, in order to determine whether a current change in gradient level is valid. In this manner, unnecessary volatility in the overall gradient level may be reduced. The output of the slicer with hysteresis unit 358 may be utilized to determine the extent of scaling in an image sequence. The sliced levels may enable better filter selection for the remove of digital noise artifacts. The convert to 3 bit unit 358 may reduce unnecessary precision of the slicer with hysteresis unit 358 output.

In an alternative embodiment of the invention, outputs from the horizontal IIR 352 and the vertical IIR 354 filters may be utilized to determine separate horizontal and vertical scale factors. In this regard, the weighted average unit 356 may be bypassed and the output from each IIR filter may be communicated to a slicer with hysteresis and convert to 3 bit unit to determine the separate scale factors.

The scale factor override 360 may comprise suitable logic, circuitry, interfaces and/or code that may be operable to receive a scale factor from an external source that may be used instead of the scale factor determined based on the gradient determination unit 350. In various embodiments of the invention, the scale factor override 360 may be utilized to select the output from the slicer with hysteresis or the scale factor from the external source.

In operation, the SFD 206 may generate a scale factor for an image and/or a sequence of images. The SFD 206 may also provide horizontal and vertical maximum gradients for the image or sequence of images. In various embodiments of the invention, the SFD 206 may be operable to flag an image which is scaled in either or both of the horizontal and vertical directions and may provide corresponding scale factors. For example, the scale information may be communicated to digital noise detection and/or digital noise reduction units and may be utilized to detect noise and/or to adjust digital noise filters. The SFD 206 may be configured to define a safe region within active video content for performing gradient measurements. The safe region may aid in avoiding high contrast regions of, for example, black borders and/or edges of graphics.

The SFD 206 may be operable to determine gradients on a pixel by pixel basis in the horizontal and vertical directions utilizing luma information, for example. The SFD 206 may be operable to determine which gradients to retain and which to discard for the determination of a scale factor. For example, a gradient may be discarded when it may cause an image to appear to be at native resolution regardless of whether or not the image was scaled. In this regard, standard deviation of luma levels may be determined to indicate areas of uncharacteristic high frequency noise. The standard deviation information may be enable determination of which gradients to retain and which to neglect. This may provide an amount of immunity from noisy or near Nyquist regions within an image. For example, when vertical luma spatial variation is close to Nyquist, pixels which are interpolated within a region of high frequency might still yield a gradient which may appear as a gradient in an un-scaled image.

Furthermore, sharp contrast edges at black borders and/or graphics borders may be avoided when determining max gradients for scale factor detection. The SFD 206 may determine an overall maximum horizontal gradient and an overall maximum vertical gradient for an image. The maximum gradients may be IIR filtered and averaged together. The average maximum gradient for an image may be quantized prior to determine a scale factor for the image and the results may be distributed to other digital noise processing units such as one or more of block grid detection, mosquito noise detection, block grid noise reduction and mosquito noise reduction.

Figure 4:
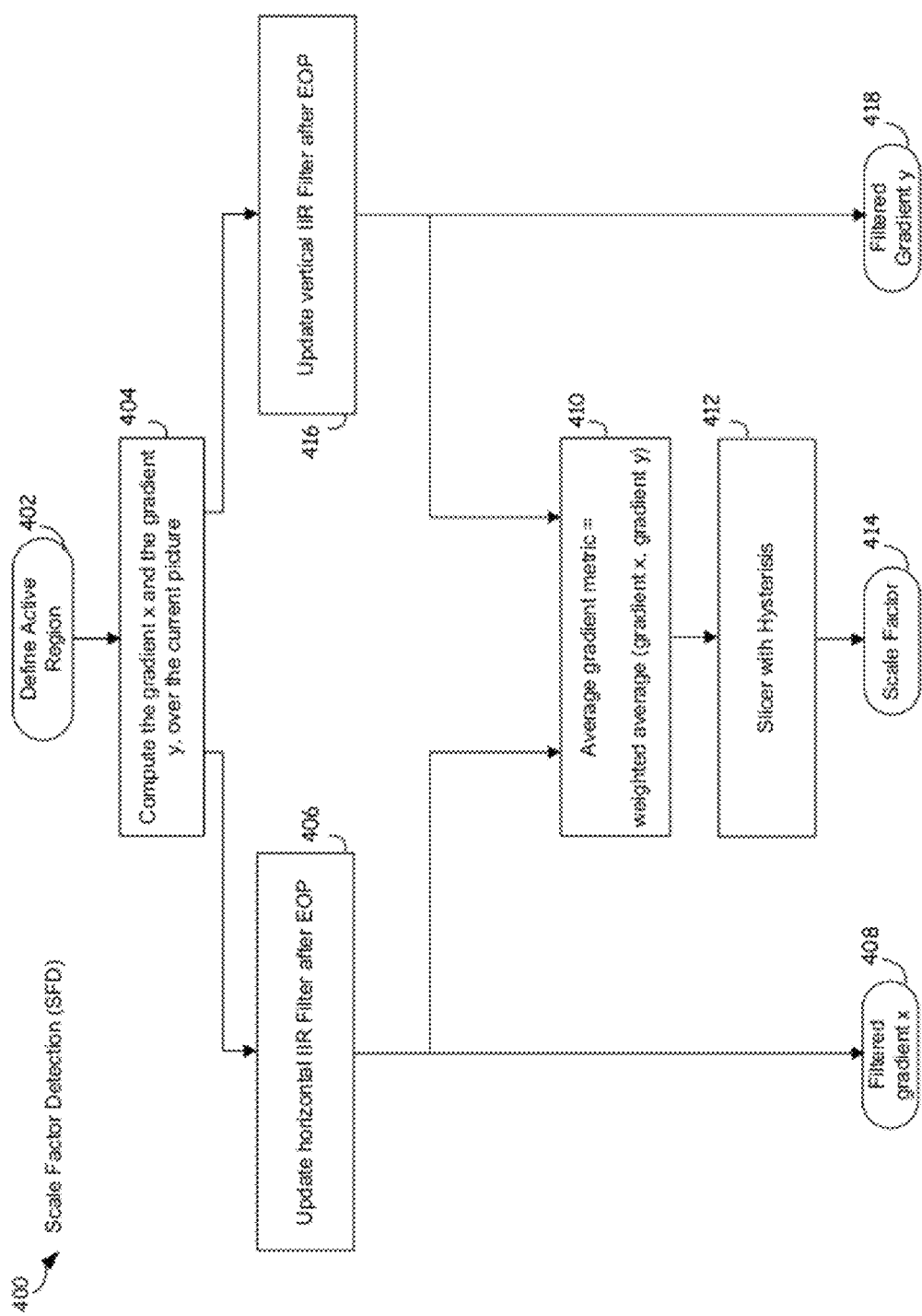
FIG. 4 is a flow chart illustrating exemplary steps for determining scale factor in compressed and/or decompressed video pictures, in accordance with embodiments of the invention.

FIG. 4 is a flow chart illustrating exemplary steps for determining scale factor in compressed and/or decompressed video pictures, in accordance with embodiments of the invention. Referring to FIG. 4, the exemplary steps may begin at step 402. In step 402, active regions for gradient detection within a current picture may be determined. In step 404, on a pixel by pixel basis, within the active region, horizontal gradients x and vertical gradients y may be determined for the current picture. In step 406, at the end of the picture, a horizontal IIR filter may be updated. In step 408, the horizontal gradients x may be filtered. In step 416, a vertical IIR filter may be updated after the end of the picture. In step 418, the vertical gradients y may be filtered. In step 410, overall average gradient metrics for the current picture may be determined for the horizontal direction and the vertical direction as weighted averages of the gradient x and of the gradient y. In step 412, the overall horizontal and vertical gradients may be quantized and adjusted based on fluctuations in previously determined overall gradients. In step 414, the SFD 206 may output a horizontal overall gradient and a vertical overall gradient for the current image.

Figure 5:
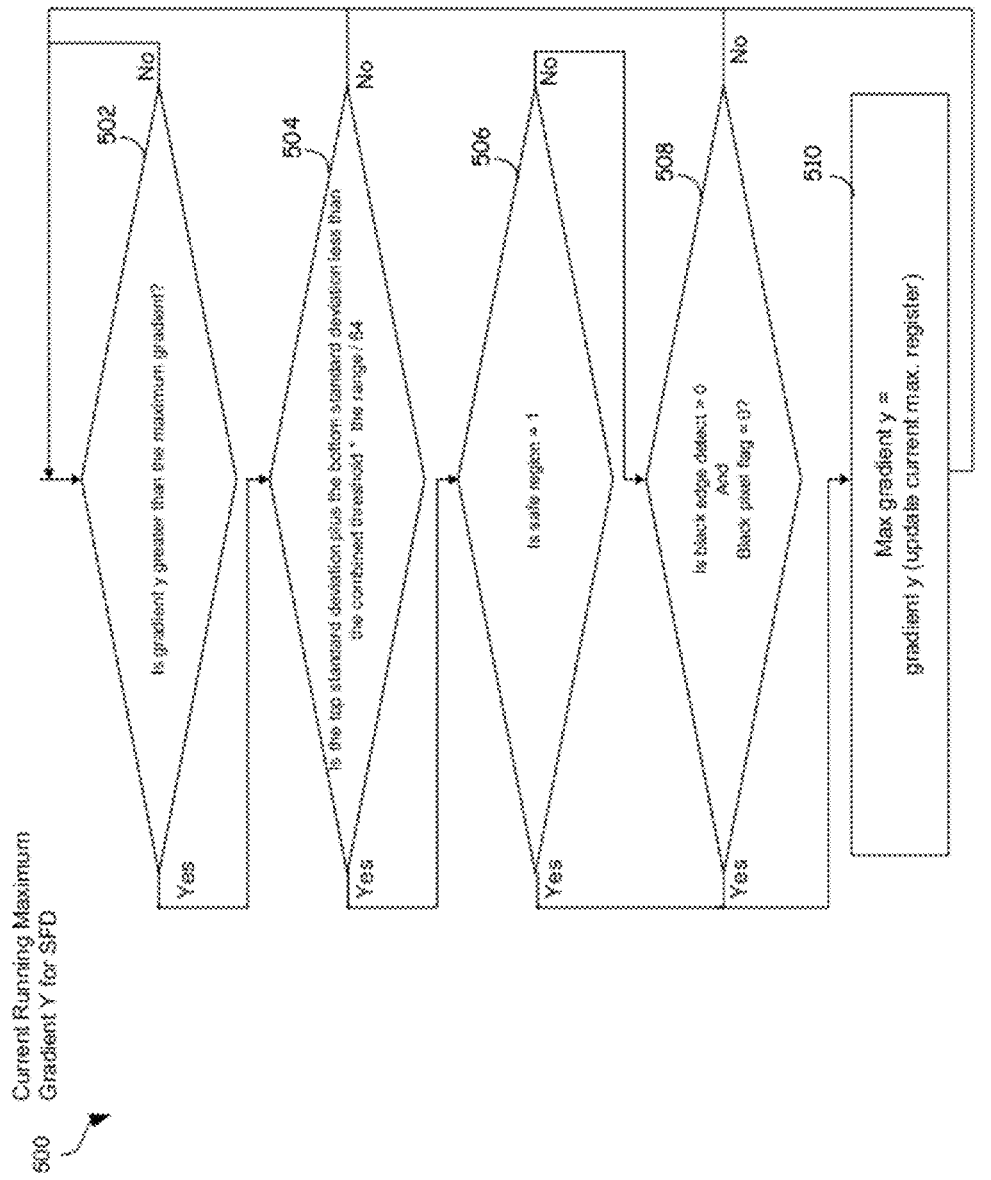
FIG. 5 is a flow chart illustrating exemplary steps for determining a current running maximum gradient, in accordance with an embodiment of the invention.

FIG. 5 is a flow chart illustrating exemplary steps for determining a current running maximum gradient, in accordance with an embodiment of the invention. Referring to FIG. 5, the exemplary steps may begin at step 502. In step 502, in instances when the gradient y over a vertical window of pixels is greater than the maximum gradient, proceed to step 504. In step 504, in instances when a top standard deviation plus a bottom standard deviation is less than threshold*range/64, proceed to step 506. In step 506, instances when the current pixel is not in a safe region, proceed to step 508. In step 508, in instances when the current pixel is not in a safe region and a plurality of pixels within the vertical window are black (black edge detect>0) and the plurality of black pixels are not contiguous (black pixel flag=0), proceed to step 510. In step 510, set the maximum vertical gradient in the current maximum gradient register to the current vertical gradient as follows: Max gradient y=gradient y. In step 502, in instances when the current gradient 6 is less than or equal to the maximum gradient, return to the top and wait for the next y gradient. In step 504, in instances when a top standard deviation plus a bottom standard deviation is greater than or equal to threshold*range/64, proceed to step 502 and wait for the next y gradient. In step 506, in instances when the current pixel is in a safe region, proceed to step 510. In step 508, in instances when the current pixel is not in a safe region and there is a plurality of contiguous black pixels in the vertical window, proceed to step 502 and wait for the next y gradient.

Figure 6:
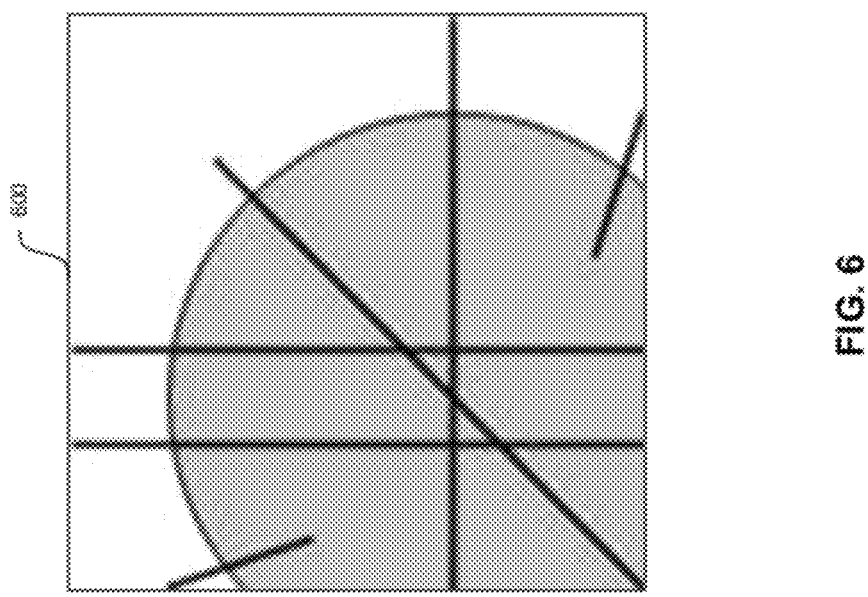
FIG. 6 is a diagram that illustrates various aspects of mosquito noise in video systems, in accordance with an embodiment of the invention.

FIG. 6 is a diagram that illustrates various aspects of mosquito noise in video systems, in accordance with an embodiment of the invention. Referring to FIG. 6, there is shown a video image 600 comprising typical mosquito noise. Mosquito noise refers to MPEG artifacts that may be caused by quantization of high frequency components. Mosquito noise may be an artifact of 8×8 block, discreet cosign transform (DCT) and may originate within blocks. Motion compensation and/or scaling may carry mosquito noise beyond a block boundary. Mosquito noise may occur near sharp luma edges, for example, credits, text and cartoons may be highly susceptible. Mosquito noise may occur and may be more severe at low bit rates. Mosquito noise may appear as high frequency noise within a block. In some instances, horizontal edges may cause horizontal ringing and vertical edges may cause vertical ringing. Vertical and horizontal ringing may be additive, for example. When the edges are diagonal, a checkerboard pattern may occur near the diagonal edge. The checkerboard patterns may be stronger near an intersection between a horizontal and a vertical edge the ringing that occurs in horizontal or vertical edges. Moreover, mosquito noise may not fade away from edges as does the fast Fourier transform (FFT) ringing that occurs as a result of Gibb's phenomenon. In some instances, the largest mosquito noise spike may actually occur farthest from the edge.

Figure 7:
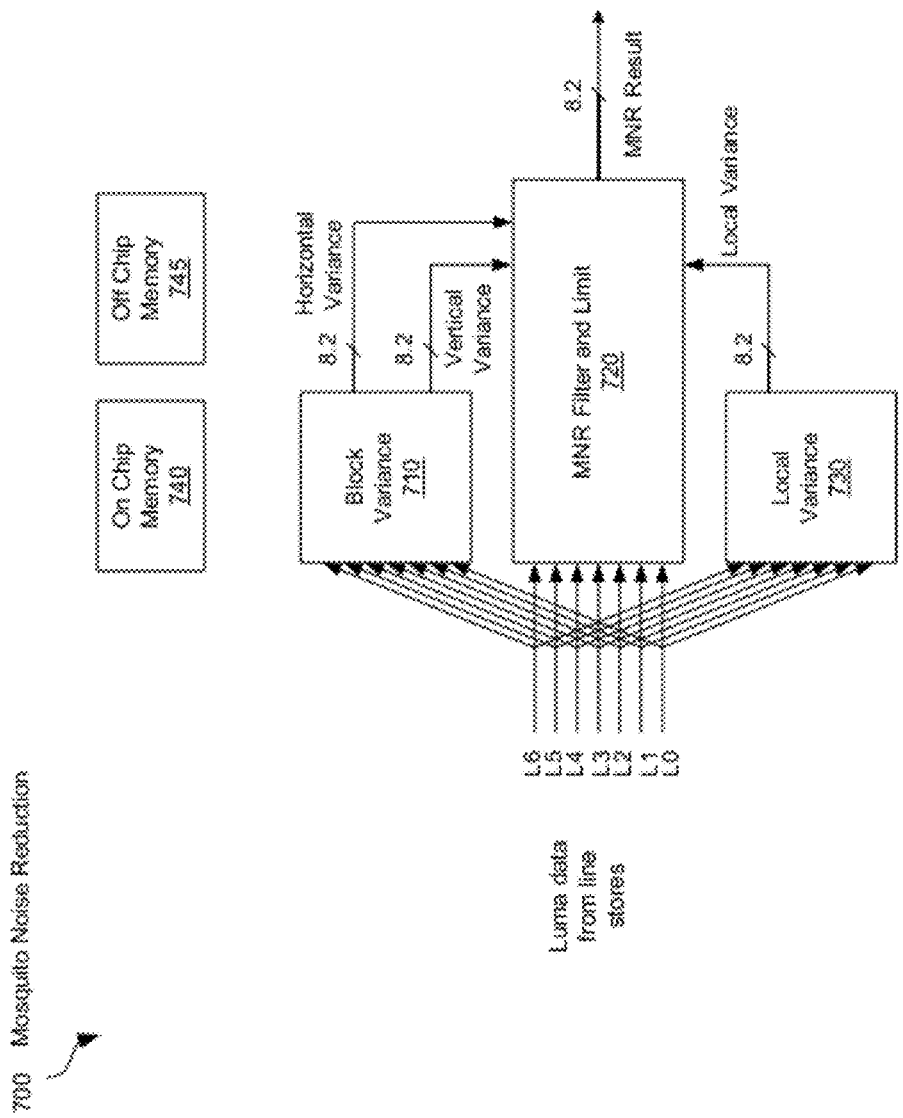
FIG. 7 is a block diagram that illustrates an exemplary mosquito noise reduction system that may be operable to perform mosquito noise strength estimation and mosquito noise reduction, in accordance with an embodiment of the invention.

FIG. 7 is a block diagram that illustrates an exemplary mosquito noise reduction system that may be operable to perform mosquito noise strength estimation and mosquito noise reduction, in accordance with an embodiment of the invention. Referring to FIG. 7, there is shown a mosquito noise reduction (MNR) system 700 that may comprise a block variance unit 710, a MNR filter and limit unit 720, a local variance unit 730 and a memory 740.

The MNR system 700 may comprise suitable logic, circuitry, interfaces and/or code that may be operable to perform separate noise detection for horizontal and vertical edges. The MNR detection may operate over a programmable range. The MNR system 700 may also be operable to perform separate horizontal and vertical filtering of noise artifacts. The amount of applied filtering may be determined and/or controlled based on the separate horizontal and vertical noise detection. Also, the MNR filtering may operate over a programmable range. The amount of applied filtering and the size of the filters, for example, the number of horizontal and/or vertical taps utilized, may be determined based on a determined scale factor, for example. Additional information regarding mosquito noise reduction may be found in U.S. patent application Ser. No. 11/087,491 filed Mar. 22, 2005 and U.S. patent application Ser. No. 11/089,788 which was filed on Mar. 25, 2005. Each of the above stated applications is hereby incorporated herein by reference in its entirety.

The block variance unit 710 may comprise suitable logic, circuitry, interfaces and/or code and may be operable to find the strongest vertical and horizontal edges in a specified region of pixels. The region may be referred to as a block. In this regard, block variance refers to estimating edge strength within a block that comprises the current pixel. The size of the specified region utilized for determining block variance may vary and/or may be programmable. Block variance may be determined for data at native resolution or for data scaled at various horizontal and/or vertical scale factors. For example, in instances when a picture or sequence of pictures is scaled up, a larger block of pixels may be utilized to search for edge strength. Exemplary specified blocks or regions may comprise an 8×8 pixel blocks which correspond to one MPEG 2 encoding block, 16×16 pixel blocks, 48×48 pixel blocks, 56×40 pixel blocks and 56×56 pixel blocks. In an exemplary embodiment of the invention, video picture data may be scaled by 3× and the specified regions for determining block variance may comprise 48×48 pixels per block. In this instance, the 48×48 blocks may be subdivided into 8×8 blocks for block variance determination operations. Block variance determination may differentiate edges from noise and/or from content texture. Intermediate results from horizontal and vertical block variance operations may be stored on on-chip memory 740, for example. Results of horizontal and vertical block variance for previous pictures may be stored in off chip memory, for example.

The local variance unit 730 may comprise suitable logic, circuitry, interfaces and/or code that may be operable to estimate local variance around a current pixel. The local variance may be utilized to control mosquito noise filtering operations. The size of the pixel region for determining local variance may vary and/or may be programmable.

The MNR filter and limit unit 720 may comprise suitable logic, circuitry, interfaces and/or code may be operable to perform separate horizontal and vertical filtering to reduce mosquito noise artifacts. MNR filter and limit unit 720 may comprise, for example, a median filter which may be controlled by a median filter limit. Moreover, the MNR filter and limit unit 720 may comprise linear filters such as, for example, a horizontal FIR filter and a vertical FIR filter which may be controlled by a horizontal limit and a vertical limit respectively. One or both of the median and FIR filters may be utilized to filter the mosquito noise. In this regard, the extent of filtering may be controlled by corresponding limits. The limits may be determined for each pixel and may be determined based on block variances and local variances. Additional median filtering, which may be applied to pixel input, prior to determining edge strengths, may be utilized for texture preservation. The MNR filter and limit unit 720 may support filtering of scaled content and may operate over a programmable range of pixels based on scale factor detection, for example. The MNR filter and limit unit 720 may be operable to adapt to scale factor detection (SFD) and mosquito noise strength estimation (MNSE) and may comprise adjustable filter taps, adjustable coefficients, adjustable search range and/or adjustable strength.

Figure 8:
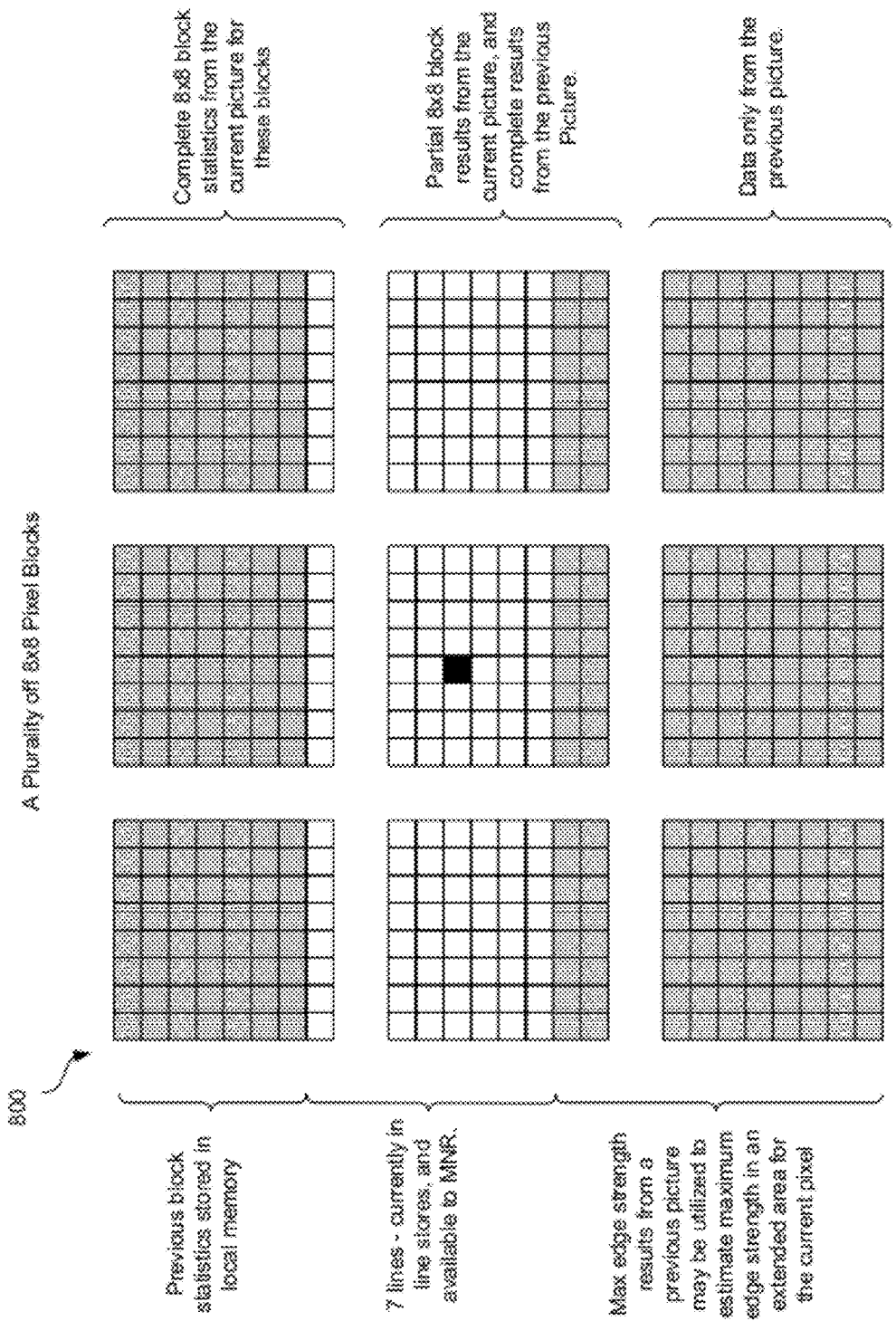
FIG. 8 is a diagram that illustrates a region of 8×8 pixel blocks that may be utilized to determine horizontal variances, vertical variances, and/or block variances, in accordance with an embodiment of the invention.

FIG. 8 is a diagram that illustrates a region of 8×8 pixel blocks that may be utilized to determine horizontal variances, vertical variances, and/or block variances, in accordance with an embodiment of the invention. Referring to FIG. 8, there is shown a block of pixels 800.

The block of pixels 800 may comprise a plurality of 8×8 blocks for computing horizontal and vertical variances which may be referred to as H_var and V_var respectively and for determining maximum horizontal and vertical variances. In this regard, variance may refer to the absolute value of the difference between two pixel luma levels where the pixels may be horizontal or vertical neighbors and/or may be vertically or horizontally aligned but separated by one or more pixels. The luma variances may indicate a luma edge strength and a maximum variance may indicate the maximum luma edge strength in a block of pixels. Mosquito noise may be indicated where large edge strengths are found.

An 8×8 block size may be utilized for determining block statistics, for example, however, the invention is not limited in this regard and larger block sizes may be utilized. Mosquito noise may span a plurality of 8×8 pixel blocks. For example, when content is scaled vertically and/or horizontally, mosquito noise may be drawn away or stretched from a current 8×8 block to one or more other blocks. A plurality of 8×8 blocks may be utilized for determining statistics for a larger block area from which maximum edge strengths may be determined. This may be referred to as merging blocks. For example, for vertical merging, a maximum block variance may be determined from up to three blocks above and three blocks below a current 8×8 block. Similarly, for horizontal merging, up to three blocks to the left and three blocks to the right of a current 8×8 block may be merged to determine a maximum horizontal variance. However, the invention is not limited with regard to any specific number of merged blocks. In some instances, when merging blocks, statistics from a previous picture may be utilized with statistics from a current picture to determine block statistics.

Referring to FIG. 8, lines of luma pixels in the un-shaded middle area, that are currently stored in the line stores and available for processing, may be utilized to determine new block edges and maximum block edges for a specified block area. The middle un-shaded section of the block of pixels 800 represents current lines which may be utilized for determining horizontal variance (H_var), vertical variance (V_var) maximum horizontal variance (Max H_var), maximum vertical variance (Max V_var) and in some instances, combined horizontal and vertical variances and/or combined maximum variances. One more of these results may be referred to as statistics, pixel statistics and/or block statistics. In various embodiments of the invention, when determining the statistics for a block, for example, an 8×8 block or a larger block size, processing may begin with a current pixel at the top, left corner of the block and may continue through the block in a raster scan fashion, calculating statistics one pixel at a time, from the top left corner of the block through to the last pixel in the block, however, the invention is not limited in this regard.

Referring to FIG. 8, statistics that may be available from previously processed rows of a current picture are represented in the upper shaded area of the block of pixels 800. These results may be stored in the on-chip memory 740 shown in FIG. 7, for example. The lower shaded area of the block of pixels 800 may represent results from a previous picture that are located in the previous picture, in the same location as shown, relative to the current pixel. The lower shaded area statistics results which are determined from a previous picture may be utilized when estimating statistics for a current pixel. For example, a maximum variance for pixels below the location of a current pixel in a block, from a previously processed picture, may be available for determining a current maximum variance for the current block. Previous picture statistics results may be utilized when a block size spans the pixels with results available from the current picture and results available from the previous picture. In various embodiments of the invention, the previous picture results may be stored in off-chip memory 454, for example.

Figure 9A:
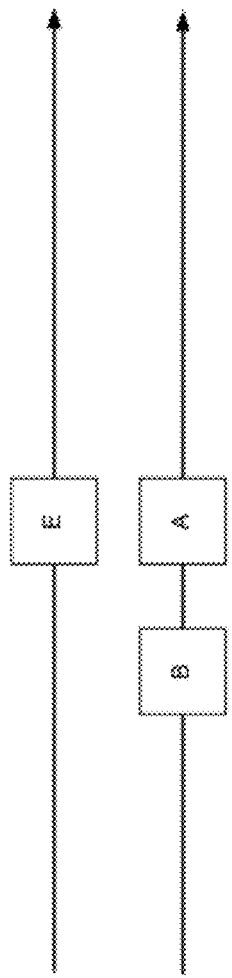
FIGS. 9A and 9B are diagrams that illustrate exemplary horizontal variance and vertical variance determination, in accordance with an embodiment of the invention.
Figure 9B:
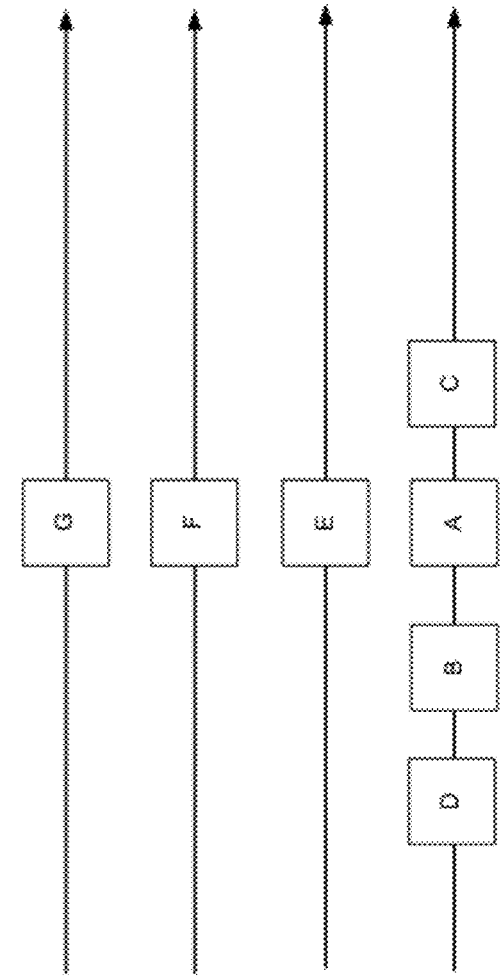

FIGS. 9A and 9B are diagrams that illustrate exemplary horizontal variance and vertical variance determination, in accordance with an embodiment of the invention. Referring to FIG. 9A, there is shown a portion of a block of pixels 900A.

The block variance unit 710, shown in FIG. 7, may be operable to perform determination of horizontal and vertical luma variances for luma edge detection on a pixel by pixel basis and may determine a horizontal and vertical block variance parameter (block_var) based on the detected edges over an entire block or picture. The sharpness of a detected luma edge rather than its length may determine the strength of the mosquito noise. For example, a large step in luma value between compared pixels may indicate mosquito noise. Gently sloping contents in an image block may not generate mosquito noise.

In operation, the block variance unit 710 may determine the block variance parameter by serially calculating and/or determining a maximum horizontal variance parameter (Max H_var) and/or a maximum vertical variance parameter (Max V_var). The value of Max H_var may correspond to the maximum left and right difference between horizontally aligned pixels in an pixel block. The value of V_var may correspond to the maximum top and bottom difference between vertically aligned pixels in an image block. The aligned pixels may be immediate neighbors or may be separated by one or more pixels. In instances when a picture comprises native resolution, the aligned pixels may be immediate neighbors. In instances when a picture or portion of a pixel is scaled, the aligned pixels may be separated by one or more pixels.

The values for Max H_var and Max V_var may be reset to a default value at the start of each pixel block for SD pictures or may be scaled from previously determined values for HD pictures. In this regard, a reset default value may be zero.

Referring to FIG. 9A, there is shown two vertically aligned neighboring pixels A and E. There is also shown, two horizontally aligned neighboring pixels A and E.

In operation, in order to determine horizontal and vertical edge strengths, the following horizontal variance and a vertical variance operations may be performed:

H_var=abs($A-B$)

V_var=abs($A-E$)

Where the horizontal and vertical variances may be determined by an operation comprising: absolute value of the difference in luma between two horizontally neighboring pixels and between two vertically neighboring pixels, respectively.

Referring to FIG. 9B, there is shown a portion of a block of pixels 900B. The portion of the block of pixels 900B comprises four vertically aligned pixels A, E, F and G and four horizontal neighboring pixels D, B, A and C. In some instances, a picture may be scaled in one or both of horizontal and vertical directions. Variance may be determined over a wider distance to account for scaling in an image, for example, as follows:

For a horizontal range of 0:H_var=abs($A-B$)

For a horizontal range of 1:H_var=abs($C-B$)

For a horizontal range>=2:H_var=abs($C-D$)

For a vertical range of 0:V_var=abs($A-E$)

For a vertical range of 1:V_var=abs($A-F$)

For a vertical range>=2:V_var=abs($A-G$)

where the horizontal and vertical variances may be determined by an operation comprising: absolute value of the difference in luma between two horizontally aligned pixels and between two vertically aligned pixels, respectively.

In various embodiments of the invention, prior to determining edge strength, the input may be filtered, for example, by a median filter. In this manner, block variance results may avoid instances where content texture might erroneously be interpreted as mosquito noise edge strength.

In an exemplary embodiment of the invention, a maximum horizontal and maximum vertical variance, over an 8×8 pixel block, may be determined based on intermediate horizontal and vertical variance values determined for each pixel in the block. Prior to the start of variance determination for an 8×8 block of pixels, a maximum horizontal variance (Max H_var) and a maximum vertical variance (Max V_var) may be initialized to zero. At each location in a block, for example in each of 64 locations in an 8×8 block, the horizontal and vertical variances may be determined and Max H_var and/or Max V_var may be updated with the maximum horizontal and maximum vertical variances, respectively, found thus far. Exemplary operations for determining maximum variances for luma pixel values may comprise the following:

Max H_var=MAX[Max H_var,abs($p_1-p_2$)], and

Max V_var=MAX[Max V_var,abs($p_1-p_3$)]

Where $p_1$ and $p_2$ are horizontally aligned pixels, $p_1$ and $p_3$ are vertically aligned pixels and $p_1$ may represent the current pixel.

In various embodiments of the invention, intermediate and/or final results may be stored in on-chip memory 740 and/or off-chip memory 745.

In various embodiments of the invention, the mosquito noise reduction (MNR) system 700 may be configured to merge variance results from a plurality of 8×8 blocks in order to find a "block variance" for a larger window of pixels which may also be referred to as a block. For example, this may occur in instances when the SFD unit 102 or the SFD unit 206, indicates that an image has been scaled in one or both of the vertical and horizontal directions. Merging blocks may be helpful when scaling causes mosquito noise to be expanded over a plurality of 8×8 blocks. Also, merging results from a plurality of 8×8 blocks over a wider window may enable a reduction in memory and/or processing costs.

Figures 10A, 10B:
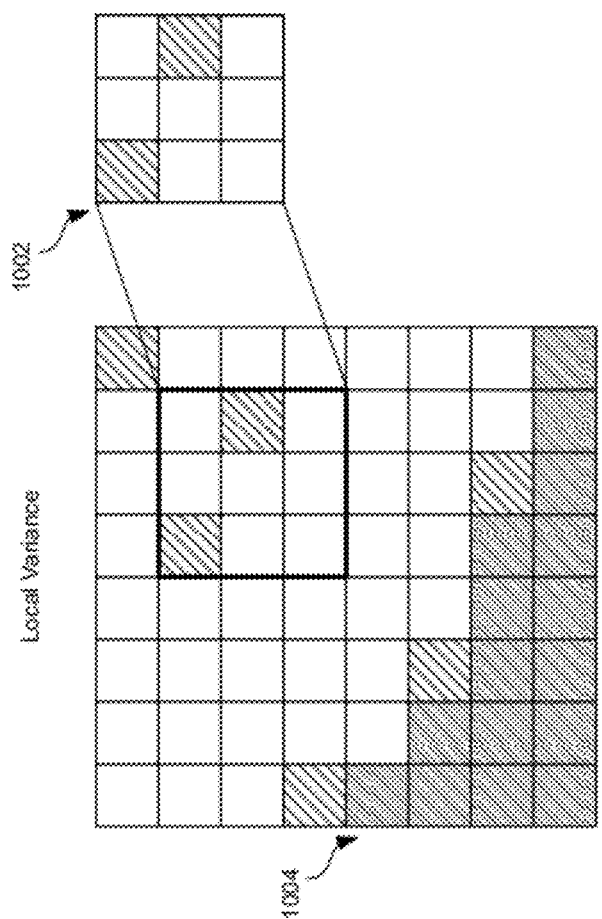
FIGS. 10A and 10B are diagrams that illustrate a group of local pixels that may be utilized to determine local variances, in accordance with an embodiment of the invention.

FIGS. 10A and 10B are diagrams that illustrate a group of local pixels that may be utilized to determine local variances, in accordance with an embodiment of the invention. Referring to FIG. 10A, there is shown a larger block of pixels 1004 and a smaller block of pixels 1002.

Within the larger block of pixels 1004 there is shown a region of pixels represented with narrowly spaced hashed lines. These pixels may correspond to a luma edge in the lower left corner of the larger block 1004. The pixels represented with widely spaced hashed lines may correspond to mosquito noise artifacts that may occur in the image block as a result of MPEG coding, for example. The inset smaller block of pixels 1002 may correspond to a current portion of the larger block 1004 that for which local variance may be determined.

Referring to FIG. 10B, there is shown the smaller block 1012 that comprises exemplary pixel labels that correspond to the pixels in the inset smaller block 1002 of FIG. 10A. The pixel labeled B11 may correspond to a current pixel for which local variances may be determined based on the smaller block 1012.

A local variance (local_var) may be determined for the current pixel in the smaller block 1012. In this regard, local_var may be determined based on a luma value for the current pixel B11 and maximum and minimum luma values of other pixels in the smaller block 1012. A local maximum luma value (local_max) and local minimum luma value (local_min) may be determined by the following expressions, for example:

local_max=MAX[A10,A11,A12,B10,B11,B12,C10, C11,C12], local_min=MIN[A10,A11,A12,B10,B11,B12,C10, C11,C12]

where [A10, A11, A12, B10, B11, B12, C10, C11, C12] may represent luma values at their respective pixel locations shown in FIG. 10B.

The local variance (local_var) may be determined for each pixel. For example, for the current pixel B11 and the smaller block 1012, the local variance may be determined as follows:

local_var=MAX (local_max−B11,B11−local_min)

where B11 represents the luma value of the current pixel located in the B11 position of the smaller block 1012.

Figure 11:
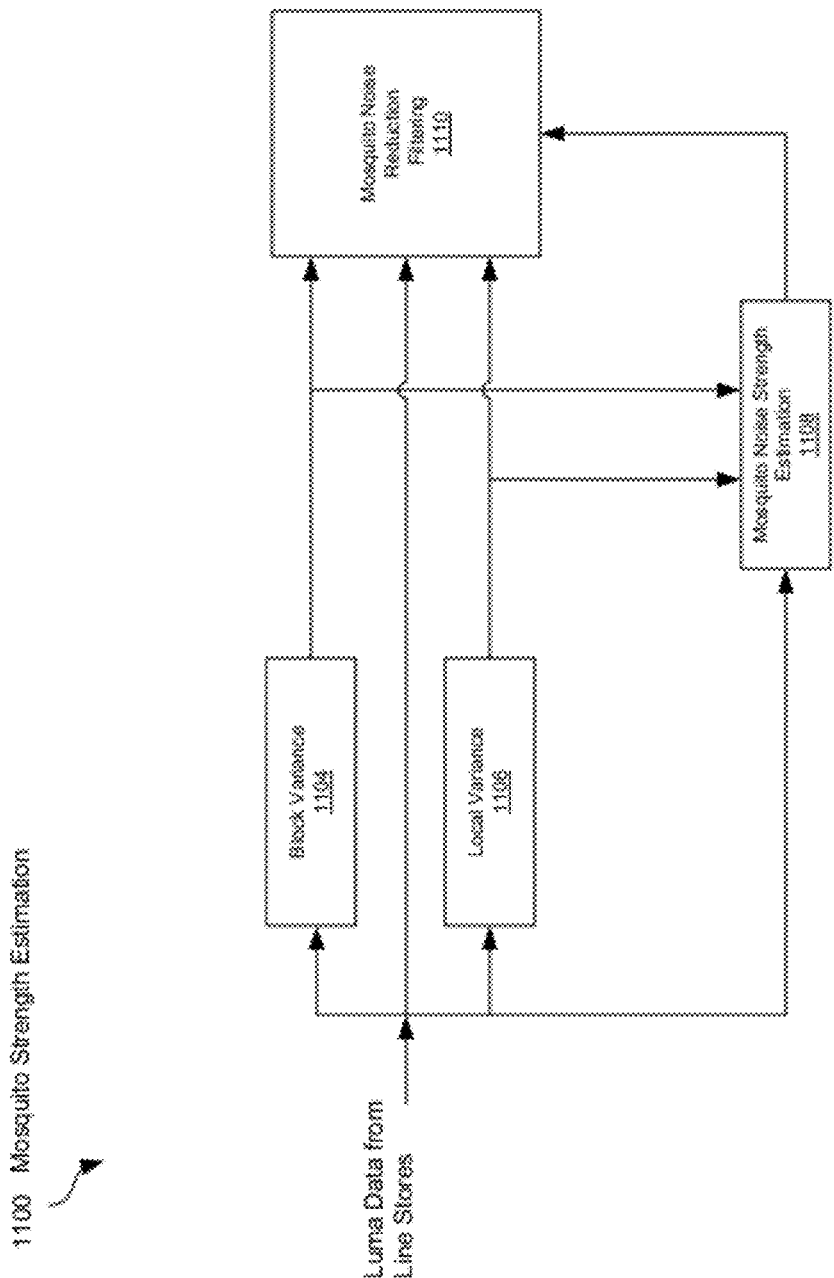
FIG. 11 is a block diagram that illustrates exemplary mosquito noise strength estimation and mosquito noise reduction functions, in accordance with an embodiment of the invention.

FIG. 11 is a block diagram that illustrates exemplary mosquito noise strength estimation and mosquito noise reduction functions, in accordance with an embodiment of the invention. Referring to FIG. 11, there is shown the block variance unit 710, the local variance unit 730, the mosquito noise strength estimation unit (MNSE) 1108 and the mosquito noise reduction (MNR) filter 1110.

Functionality of the block variance unit 710 and the local variance unit 730 is described with respect to FIGS. 7, 8, 9A, 9B, 10A and 10B. The block variance unit 710 comprises suitable logic, circuitry, interfaces and/or code that are operable to estimate edge strength within a pixel block that comprises a current pixel. In various instances, the pixel block may be greater than 8×8 pixels, for example, a plurality of 8×8 pixels may be merged for determining a block variance. The local variance unit 730 may comprise suitable logic, circuitry, interfaces and/or code that may be operable to estimate a local variance about a current pixel.

The MNSE unit 1008 may be operable to estimate how much mosquito noise is present in a pixel block or an entire picture, by pre-filtering the block or picture and comparing the input pixel levels to the filtered output pixel levels, for example, as follows:

$$Q = \frac{1}{N \cdot M} \cdot \sum_{x=1}^{N} \sum_{y=1}^{M} \text{ABS}(\text{in}(x, y) - \text{filtered}(x, y))$$

Where in(x, y) represents a current pixel, filtered (x, y) represents a corresponding filtered pixel and Q represents a delta over an N×M block of pixels. In this regard, M×N pixels may comprise an entire video picture.

The delta Q may be normalized relative to the edge strength over the pixel block, or entire picture as follows:

$$E = \frac{1}{N \cdot M} \cdot \sum_{x=1}^{N} \sum_{y=1}^{M} \text{EDGE\_STRENGTH}(x, y)$$

The raw mosquito noise strength for a given pixel block or for an entire picture may be represented as:

$$MNS_{raw} = \frac{Q}{E}$$

The difference or delta Q may also be an indication of filter corrections that may be applied to the input pixels to reduce mosquito noise by the MNR filter 1110. A limit may be determined to modify filter corrections performed by the MNR filter 1110 based on estimated edge strength. In this regard, the value of limit may control how much filter correction may be applied to input pixels from the line stores, by the MNR filter 1110.

The MNSE 1108 may comprise suitable logic, circuitry, interfaces and/or code that may be operable to estimate mosquito noise strength in a block of pixels and/or may generate a MNR filtering limit. The MNR filtering limit may comprise one or more parameters that may be utilized for making adjustments to MNR filter 1110 coefficients. An exemplary MNR filtering limit may be determined as follows:

limit=block_var−αlocal_var where α may comprise a user input parameter and limit may comprise a horizontal limit, a vertical limit or a combined horizontal and vertical 2D limit depending on the type of block variance utilized, as follows:

block_var=Max H_var(utilized for horizontal filtering)

block_var=Max V_var(utilized for vertical filtering)

block_var=MAX(H_var,V_var)(utilized for 2D filtering)

In an exemplary embodiment of the invention, in instances when α=1 and a block_var is much greater than a local_var, the MNSE unit 1108 may determine that mosquito noise strength is large for a current pixel. Thus, the limit value may be large and may enable stronger filter coefficients in the MNR filter 1110. In instances when block_var not much greater than a local_var, the MNSE unit 1108 may estimate that the presence of mosquito noise is not likely in the current pixel. In this regard, the value of limit may be small and the MNR filter 1110 may reduce the strength of filter coefficients. In various embodiments of the invention, the limit may be "clamped" to a range of values, for example, greater than or equal to zero.

In operation, the block variance unit 1104 and/or the local variance unit 1106 may be operable to receive luma pixel input from line stores such as the line stores 206, for example. The block variance unit 1104 may be operable to determine maximum horizontal, maximum vertical and/or maximum combined horizontal and vertical block variances over a block of pixels which may be greater than 8×8 pixels. The local variance unit 1106 may be operable to determine a local variance for each pixel in the pixel block. The MNSE unit 1108 may estimate mosquito noise edge strength in horizontal and vertical directions for each pixel in the pixel block and may generate horizontal, vertical and combined limit values for adjusting MNR filter coefficients based on the estimated edge strengths.

The MNR filter 1110 may receive the luma pixel input from the lines stores and may receive the maximum horizontal variance, the maximum vertical variance and/or the maximum combined horizontal and vertical variances over the block of pixels from the block variance unit 110. The MNR filter 1110 may receive the local variances on a pixel by pixel bases form the local variance unit 1106. In addition, the MNR filter 1110 may receive the limit value determined by the MNSE unit 1108. The MNR filter 1110 may determine horizontal and vertical filter coefficients for the block of pixels based on the block variances and may adjust the filter coefficients based on the horizontal, vertical and combined limits. The MNR filter 1110 may output filtered pixels.

Figure 12:
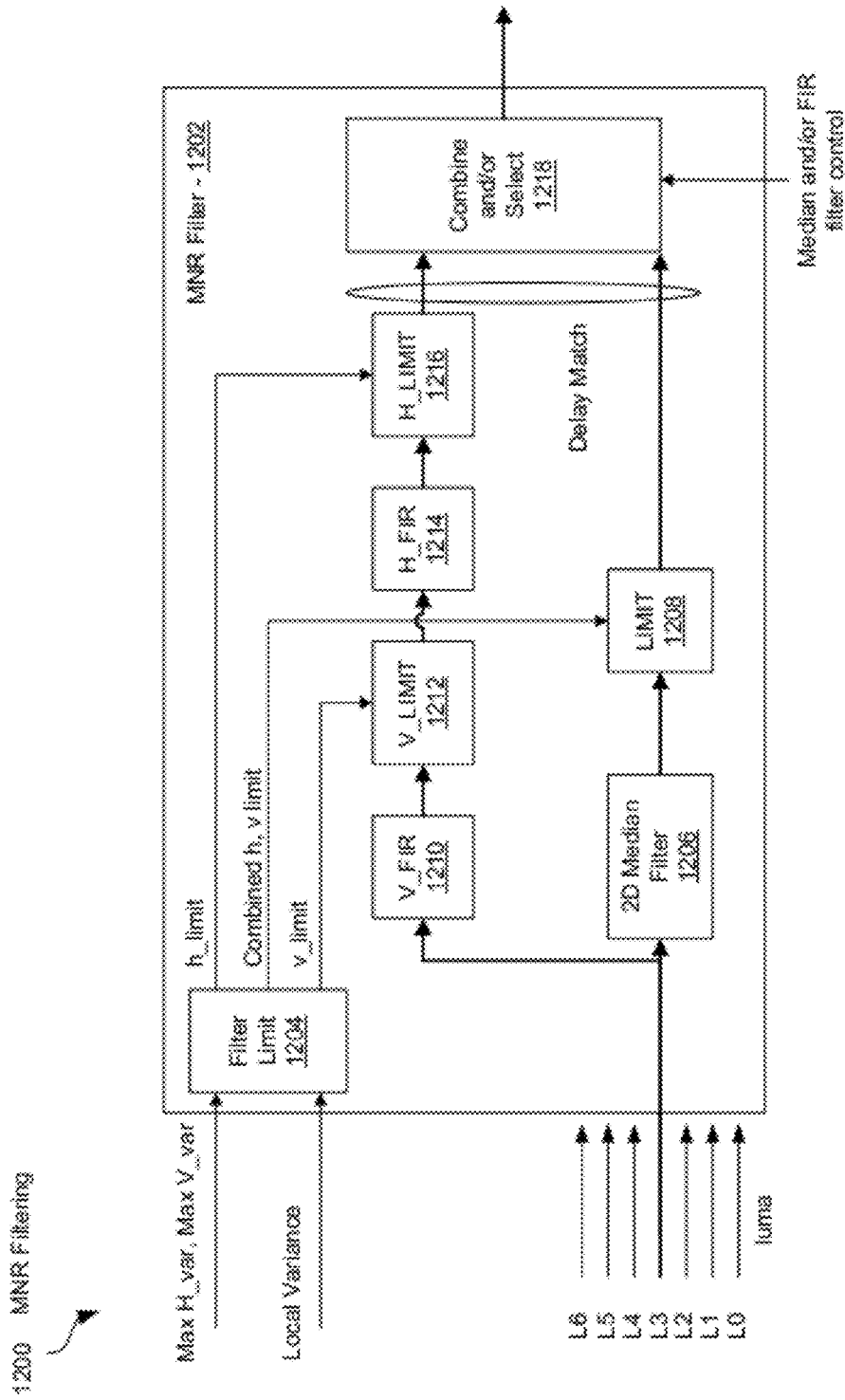
FIG. 12 is a block diagram that illustrates exemplary mosquito noise mosquito noise reduction, in accordance with an embodiment of the invention.

FIG. 12 is a block diagram that illustrates exemplary mosquito noise mosquito noise reduction, in accordance with an embodiment of the invention. Referring to FIG. 12, there is shown a mosquito noise reduction filter unit 1202, a filter limiter unit 1204, a vertical linear filter 1210, a vertical filter limiter 1212, a horizontal linear filter 1214, a horizontal filter limiter 1216, a 2D median filter 1206, a 2D filter limiter 1208 and a blend and/or select unit 1218.

The mosquito noise reduction filter (MNR) 1202 may be similar or substantially the same as mosquito noise reduction unit 106, the MNR filter and limit unit 720 and/or the mosquito noise reduction filter 1110. The mosquito noise reduction filter 1202 may comprise suitable logic, circuitry, interfaces and/or code that may be operable to perform separate horizontal and vertical filtering and/or may be operable to perform 2D filtering, on a pixel by pixel basis. In this regard, the MNR filter 1202 may comprise median and/or linear filters, for example, FIR filters. MNR 1202 filtering may be adjusted to target horizontal mosquito noise edges horizontal, vertical mosquito noise edges and diagonal or curved mosquito noise edges that comprise horizontal and vertical components.

The MNR filter 1202 may be configurable based on mosquito noise strength estimation (MNSE) which may be performed on a pixel by pixel basis for horizontal and/or vertical directions. For example, mosquito noise strength estimation may be determined based on a difference value that may result from comparing an original pixel value to a corresponding filtered pixel value. The MNR filter 1202 may select which type of filter to utilize and/or may determine how much filtering may be contributed by one or more filters, based on the MNSE.

Furthermore, the size of the MNR filter 1202 may be configurable. For example, the number of taps utilized and/or coefficient values may be adapted based on scale factor information and/or based on whether interlaced versus progressive video is present. Also, the size of the MNR filter 1202 may be adapted based on the pixel block size utilized for MNSE.

The filter limiter unit 1204 may comprise suitable logic, circuitry, interfaces and/or code that may be operable to receive horizontal, vertical and/or block variances and a local variance and may generate one or more of a horizontal limit, a vertical limit and a combined horizontal and vertical 2D limit as described with respect to FIG. 11. The limits may be utilized to clamp and/or limit filter corrections depending upon the extent of estimated mosquito noise strength associated with a current pixel.

The vertical linear filter 1210 may comprise suitable logic circuitry interfaces and/or code that may be operable to receive a plurality of luma pixels from line stores that may correspond to a column of pixels in a video image. The vertical linear filter 1210 may output a filter correction values on a pixel by pixel basis to the vertical limiter 1212. The filter corrections may correspond to a horizontal edge strength in the column of pixels. The number of taps and/or coefficient values may be configurable and/or programmable in the vertical linear filter 1210.

The vertical limiter 1212 may comprise suitable logic, circuitry, interfaces and/or code that may be operable to adjust the filter corrections received from the vertical linear filter 1210 based on a vertical limit determined by the limiter unit 1204. The adjusted filter correction value may be output to the horizontal linear filter 1214 as part of a corresponding horizontal row of pixels in the video image.

The horizontal linear filter 1214 may comprise suitable logic, circuitry, interfaces and/or code that may be operable to receive a plurality of luma pixels that may correspond to a row in the video image and have been vertically filtered and limited and may output correction values on a pixel by pixel basis to the horizontal limiter 1216. The number of taps and/or coefficient values may be configurable and/or programmable in the horizontal linear filter 1214.

The horizontal limiter 1216 may comprise suitable logic, circuitry, interfaces and/or code that may be operable to adjust the filter correction values received from the horizontal linear filter 1214 based on a horizontal limit from the limiter unit 1204. The adjusted median filter corrections may be output to the blend and/or select unit 1218.

The 2D median filter 1206 may comprise suitable logic, circuitry, interfaces and/or code that may be operable to receive a plurality of luma pixels from line stores and may output filter corrections based on 2D combined or separate horizontal and vertical median filtering. The 2D median filter 1206 may output median filter corrections to the 2D limiter 1208. The 2D limiter 1208 may be operable to clamp or limit the median filter corrections based on a combined horizontal and vertical limit from the limiter 1204. The 2D limiter 1208 may output the 2D limited median filter corrections to the blend and/or select unit 1218.

The blend and/or select unit 1218 may comprise suitable logic, circuitry, interfaces and/or code that may be operable to receive the limited median filter correction values and the limited linear filter correction and may blend the limited filter corrections and/or select one of the filtered corrections. For example, the blend and/or select unit 1218 may be operable to compare the limited filter correction value from the median filters and the limited filter correction value from the linear filters and may be configured to select the minimum of the correction values. In this manner, the MNR filter 1202 may be operable to reduce impairment to video content that may be caused by excessive filtering. Alternatively, the blend and/or select unit 1218 may be configured to select the maximum of the two limited median and linear filter corrections. In various embodiments of the invention, the blend and/or select unit 1218 may be configured to blend the limited median and linear filter corrections. In this regard, a portion or percentage from 0 to 100% of each of the corrections may be combined. For example, a combined filter correction may utilize 25% of the limited median filter correction and 75% of the limited linear filter correction. The resulting selected and/or blended filter correction for a current pixel may be added to the original current pixel value from the line stores.

In operation, the MNR filter 1202 may be operable to generate MNR filter corrections that are adapted to mosquito noise strength and/or adapted to mosquito noise edge strength that may be oriented in horizontal, vertical, curved and/or diagonal directions. The MNR filter 1202 may determine horizontal, vertical and/or combined horizontal and vertical 2D adjustments for limiting linear and median filter corrections based on mosquito noise strength estimation (MNSE). The MNSE may be determined for horizontal and vertical directions. The MNR filter 1202 may be configurable with regard to the size of the vertical linear filter 1210, the horizontal linear filter 1214 and/or the 2D median filter 1206. In this regard, the number of taps and/or coefficient values may be configured based on scale factor detection and/or pixel block size. The MNR filter 1202 may be operable to determine a MNR filter correction for a current pixel by blending and/or combining the limited median filter corrections and the limited linear filter corrections. Alternative, the MNR filter correction may be determined by selecting one of the limited median or linear filter corrections, for example, the largest or the smallest correction. The MNR filter 1202 may add the determined MNR filter correction value to the original current pixel luma value.

Figure 13:
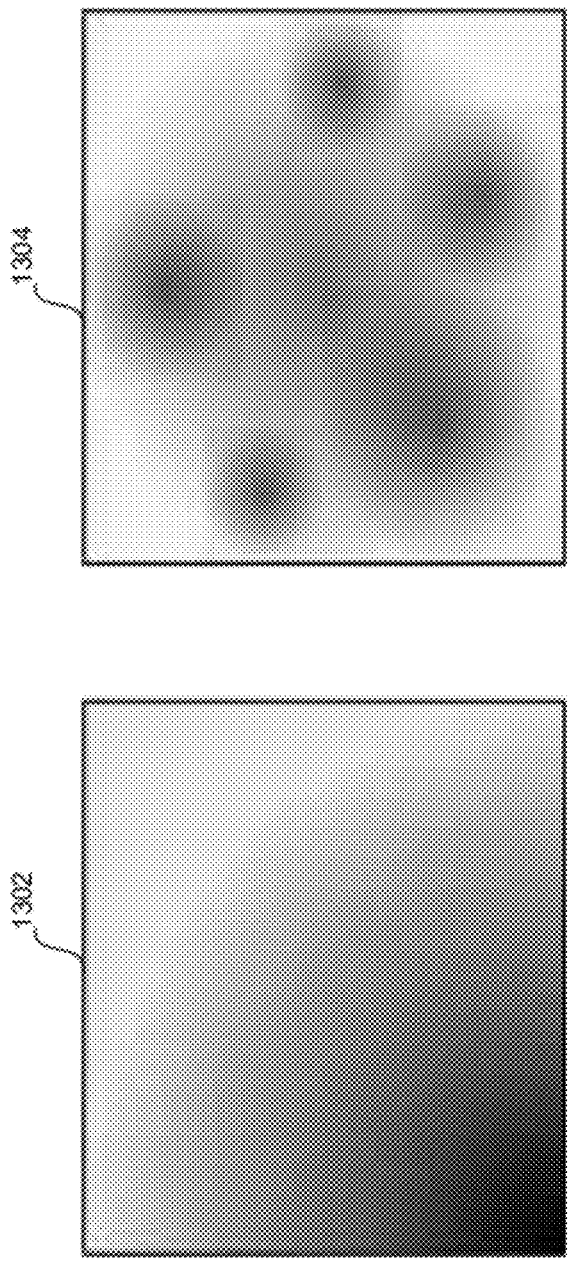
FIG. 13 is a block diagram that illustrates exemplary visual artifacts that may results from block noise, in accordance with an embodiment of the invention.

FIG. 13 is a block diagram that illustrates exemplary visual artifacts that may result from block noise, in accordance with an embodiment of the invention. Referring to FIG. 13, there is shown a first image 1302 and a second image 1304.

The first and second images 1302 and 1304 comprise visual artifacts that result from block noise in nearly-smooth regions of the image. Various aspects of video content and processing, for example, coding type, bit rate, video motion, may contribute to the presence of block noise in the first image 1302 and in the second image 1304.

Block noise is an MPEG artifact caused by quantization of low-frequency information. Block noise may appear as edges on 8×8 blocks of pixels and may give the appearance of a mosaic, or tiles. Block noise may originate as an 8×8 block discreet cosign transform (DCT) artifact occurring on block boundaries. Block noise may be seen in nearly-smooth regions, for example, in images of the sky or in faces. Also, block noise may occur in areas of high motion and high variance regions, for example, in images of moving water. Notwithstanding, block noise may be found in many other types of image content. Block noise may commonly occur in images with low bit rates and may be more severe at low bit rates. More specifically, block noise may be more severe in macroblocks coded with a higher quantization scale and/or a larger quantization matrix. Block noise may appear as discontinuities at the block edges. In some instances the block boundaries remain fixed, even when motion occurs in the underlying video image. In this regard, a static block pattern may stand out strongly against a moving background. In other instances, motion vectors may cause block noise to move with the video image. Block noise is often worse for intra blocks, and I or P pictures. Although block noise may occur in chroma, it may occur less frequently in chroma than in luma and may be perceived as being less objectionable in chroma. Vertical block noise edges may be perceived as being more objectionable than horizontal block noise edges, especially when images are viewed on an interlaced display. Block noise may often result from quantization of low-frequency terms. Block noise may be stretched and/or shifted when an image is scaled subsequent to coding and/or decoding. In addition, block noise may be shifted when interlaced content is scaled vertically or progressive content is scaled vertically into interlaced content. In this regard, a block grid shift in the vertical direction may differ between fields of opposite polarity, for example, between top and bottom fields or frames derived from top and bottom fields.

Because mosquito noise and block noise may be related to the MPEG block structure, several factors, including field or frame coding of macroblocks, chroma coding format, for example, 4:4:4/4:2:2/4:2:0, and field or frame raster scan from a feeder may need to be considered for an effective noise reduction implementation. For example, in MPEG2 main profile and in MPEG2 simple profile, chroma may be coded as 4:2:0 and may generally have block noise on 16×16 image blocks or macroblocks. The original video content may be coded into macroblocks as field data or as frame data. The original video may be coded as frame pictures by utilizing a field or frame DCT coding. When the frame DCT coding is utilized, an 8×8 luma block may comprise 4 lines from each field. When the field DCT coding is utilized, an 8×8 luma block may comprise 8 lines from a single field. The original video may also be coded as field pictures in which case an 8×8 luma block may comprise 8 lines from a single field.

Figure 14:
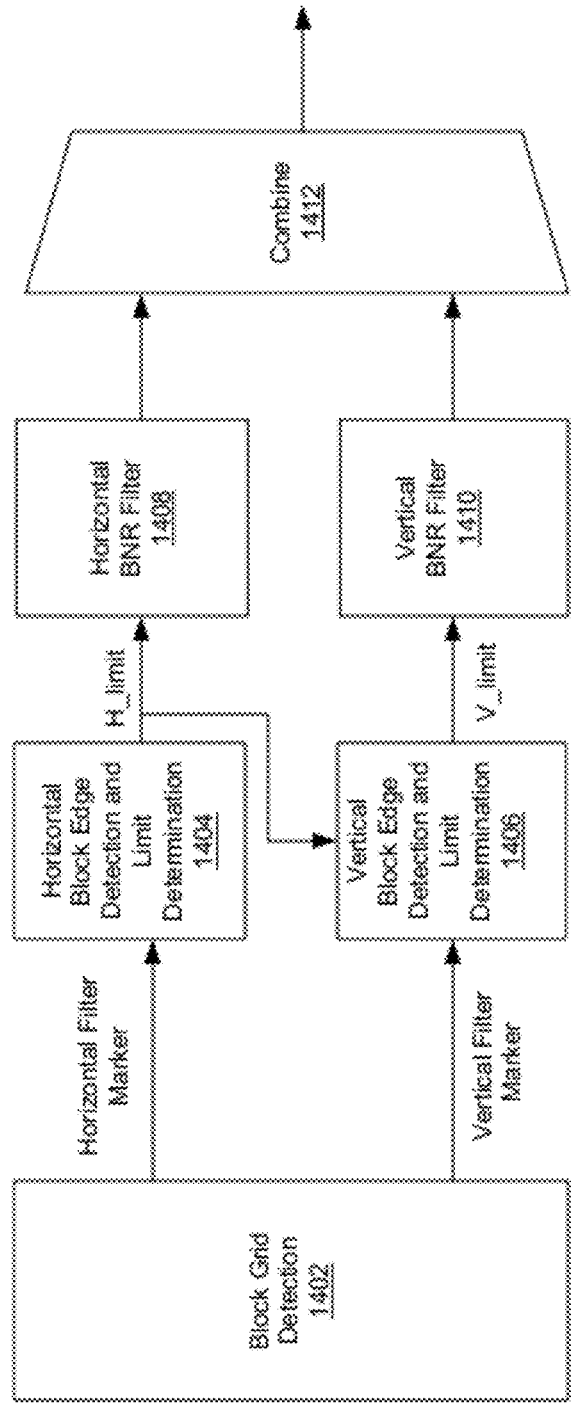
FIG. 14 is a block diagram that illustrates an exemplary block noise reduction system, in accordance with an embodiment of the invention.

FIG. 14 is a block diagram that illustrates an exemplary block noise reduction system, in accordance with an embodiment of the invention. Referring to FIG. 14, there is shown a block noise reduction system 1400 that comprises a block grid detection (BGD) unit 1402, a horizontal block edge and limit unit 1404, a vertical block edge and limit unit 1406, a horizontal block noise reduction (HBNR) filter 1408, a vertical block noise reduction (VBNR) filter 1410 and a combiner 1412.

The BGD unit 1402 may comprise suitable logic, circuitry, interfaces and/or code that may be operable to locate a block grid in an image and/or a sequence of images. In this regard, the block grid may correspond to an 8×8 DCT block grid or, for example, a scaled and/or shifted block grid. The block grid may be detectable or visible over an entire image or in only a portion of an image. In instances when a block grid appears in only a portion of a picture, it may be referred to as "localized" block noise. In a sequence of images, localized block noise may appear in different locations of different images in the sequence.

The BGD unit 1402 may be operable to detect a block grid within video content in horizontal and vertical directions independently. In each direction, a block grid size may be determined which may comprise the distance between two consecutive block boundaries. Also in each direction, a block grid shift may be determined. Block grid shift may provide an offset that indicates a distance from the top of an image to the first horizontal block grid edge and/or an offset that indicates a distance from the left side of an image to the first vertical edge, for example. The BGD unit 1402 may be operable to handle any suitable block size and/or grid shift. In this regard, the input content may be scaled and shifted in any manner. Notwithstanding, BGD may be restricted in various embodiments of the invention, based on a scale factor, for example, in instances when block size is scaled down to nearly a picture resolution level or when a particular implementation is designed to handle limited up-scaling.

The BGD unit 1402 may also be operable to determine block noise strength on a per picture basis. Block noise strength in a picture may be determined for each of a horizontal direction and a vertical direction. Block noise strength may be determined when block noise is localized or is visible over an entire picture. Block noise strength detection may be enhanced for pictures with localized block noise.

In various embodiments of the invention, block grid detection may be performed independently on each color component. In other embodiments of the invention, block grid detection may be performed for one color component, for example, luma and may be extrapolated to other color components. For example, block grid detection may be performed for luma only in instances when one expects that chroma grids are mostly aligned with a corresponding luma grid and the chroma grids may be inferred from luma grid detection results.

The BGD unit 1402 may be operable to handle vertically scaled content which may have been interlaced. For example, the content may be scaled from interlaced video to progressive video, from progressive video to interlaced video and/or from interlaced video to interlaced video. In this regard, a block grid shift in the vertical direction may differ between fields of opposite polarity, for example, between top and bottom fields or frames derived from top and bottom fields.

Horizontal block grid size, shift and strength information may be referred to as horizontal markers and may be communicated to one or both of the horizontal block edge and limit unit 1404 and the HBNR filter 1408. Vertical block grid size, shift and strength information may be referred to as vertical markers and may be communicated to one or both of the vertical block edge and limit unit 1406, and the VBNR filter 1410.

The horizontal block edge and limit (HBEL) unit 1404 and the vertical block edge and limit (VBEL) unit 1406 may each comprise suitable logic, circuitry, interfaces and/or code that may be operable to receive the horizontal and vertical markers and may detect block edges which occur in each picture along the block grid. The HBEL unit 1404 and/or VBEL unit 1406 may be operable to determine horizontal and vertical limits, respectively, that may be utilized to control or clamp block noise filter corrections by the HBNR filter 1408 and/or the VBNR filter 1410. For example, in instances when a strong block noise edge is detected in a picture, a large limit may be generated that may enable stronger filtering. In instances when block noise is not found, a zero limit may disable block noise filtering. The horizontal limit may be communicated to the HBNR filter 1408 and/or to the VBEL unit 1406. The vertical limit may be communicated to the HBEL unit 1404.

The HBNR filter 1408 and VBNR filter 1410 may comprise suitable logic, circuitry, interfaces and/or code that may be operable to filter pixels in regions near vertical block noise edges and in regions near horizontal block noise edges separately. The HBNR filter 1408 and the VBNR filter 1410 may be operable to adjust the number of taps utilized and coefficients in horizontal and vertical filtering, based on horizontal and/or vertical scaling in a picture. The HBNR filter 1408 may operate on pixels in horizontal rows to filter vertical block noise edges that may intersect the horizontal rows. Similarly, the VBNR filter 1410 may operate on pixels in vertical columns and may filter horizontal block noise edges that may intersect the vertical columns. The HBNR filter 1408 and VBNR filter 1410 may determine a pixel correction based on the difference between the filtered result and the original pixel value to the combiner 1412. Horizontal and vertical difference values may be adjusted based on the horizontal and vertical limits from the HBEL unit 1404 and the VBEL unit 1406. The adjusted differences may be combined by the combiner 1412 to produce the final BNR pixel correction. The differences may also be combined with other filter outputs, for example, from the MNR 1202. The final pixel correction may be added the original pixel value.

In operation, the block noise reduction system 1400 may be operable to read rows of pixels from the line stores to the Block grid detection (BGD) unit 1402 and may perform block grid detection in horizontal and vertical directions. The BGD unit 1402 may be operable to determine block grid location that may comprise a distance between horizontal grid lines and a distance between vertical grid lines. The BGD unit 1402 may determine horizontal and vertical block grid shifts that indicate the distance from the top of a picture to the first horizontal edge and/or from the side of the picture to the first vertical edge, for example. In addition, the BGD unit 1402 may determine block noise strength on a per picture basis. The BGD 1402 may communicate horizontal and vertical markers and block noise strength information to the HBEL unit 1404 and the VBEL unit 1406. The HBEL 1404 and/or VBEL 1406 may determine horizontal and vertical limits for controlling filter corrections based on block noise strength in the vicinity of a pixel. The horizontal and vertical limits may be communicated to the HBNR filter 1408 and VBNR filter 1410. The HBNR filter 1408 and the VBNR filter 1410 may utilize horizontal and/or vertical scale factor information from the SFD 206 to configure the size of each of the BNR filters in terms of the number of taps utilized and coefficient values. The combiner 1412 may combine the horizontal and the vertical BNR pixel corrections. In various embodiments of the invention, the BNR filter corrections may be combined with other filter corrections, for example, form the MNR unit 1202.

Figure 15:
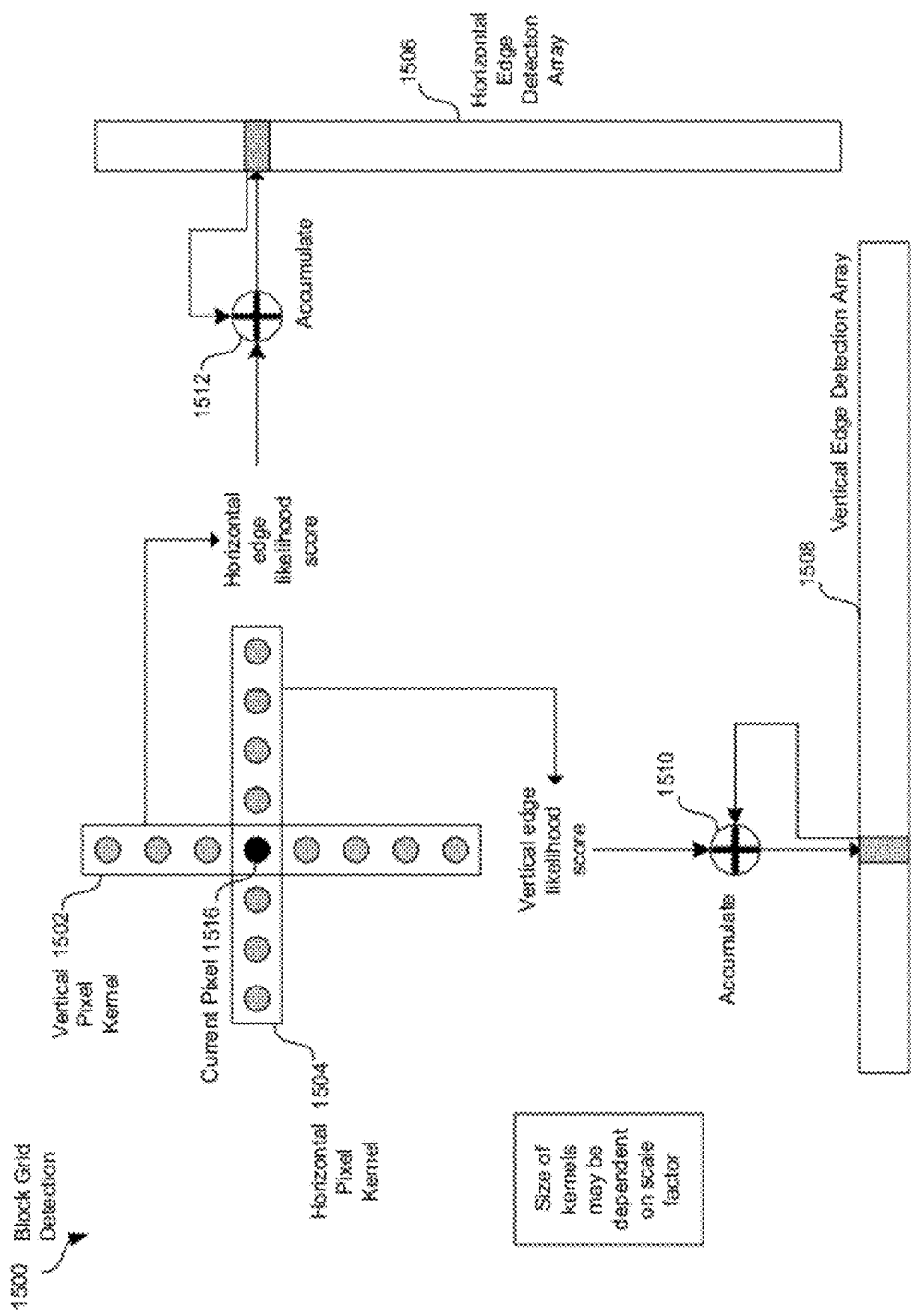
FIG. 15 is a block diagram that illustrates exemplary horizontal and vertical block grid detection arrays for a current pixel, in accordance with an embodiment of the invention.

FIG. 15 is a block diagram that illustrates exemplary horizontal and vertical block grid detection arrays for a current pixel, in accordance with an embodiment of the invention. Referring to FIG. 15, there is shown a block grid detection system 1500 that may comprise a vertical pixel kernel memory 1502, a horizontal pixel kernel memory 1504, a current pixel 1516, a horizontal block edge detection array memory 1506 and a vertical block edge detection array memory 1508. In addition, there is shown the accumulators 1510 and 1512.

The block grid detection system 1500 may be operable to determine vertical and horizontal detection arrays that may be utilized to determine block grid edges and/or block grid strength for a video picture and/or for a sequence of video pictures. Block grid edges in the horizontal direction may be determined independently from vertical grid edges.

The vertical pixel kernel memory 1502 and the horizontal pixel kernel memory 1504 may each comprise a pixel samples, for example, eight pixel samples; however, the invention is not limited with respect to any specific kernel size. The number of pixels samples that are utilized in each direction may be determined based on horizontal and/or vertical scaling in a picture. For example, a greater number of pixels may be utilized in pictures that have been up-scaled.

The horizontal block edge detection array memory 1506 and the vertical block edge detection array memory 1508 may be utilized to store horizontal block edge likelihood scores and vertical block edge likelihood scores respectively. The horizontal and vertical block edge detection array memories 1506 and 1508 may be utilized to determine block grid location, shift and strength in both directions.

In an exemplary operation, the vertical pixel kernel memory 1502 may comprise suitable logic, circuitry, interfaces and/or code that may be operable to detect horizontal block noise edges. In this regard, a horizontal block edge likelihood score for a current pixel 1516 may be determined and may be summed by the accumulator 1512 with other horizontal block edge likelihood scores for pixels from the same horizontal row. The sum may be stored in the horizontal block edge detection array memory 1506. In a similar manner, vertical edge likelihood scores may be accumulated and stored in the vertical block edge detection array memory 1508. A higher block edge likelihood score for a row or column of pixels may indicate that a block grid line may be aligned with or near the row or column.

A horizontal block edge likelihood score may be determined by comparing luma values of pixels above the current pixel in a vertical current pixel kernel with luma values of pixels below the current pixel in the vertical current pixel kernel. Based upon the difference in luma values, a horizontal likelihood score that may vary with the luma difference may be determined. In a similar manner a vertical block edge likelihood score may be determined by comparing luma pixel values to the left of the current pixel with luma pixel values to the right of the current pixel.

Figure 16:
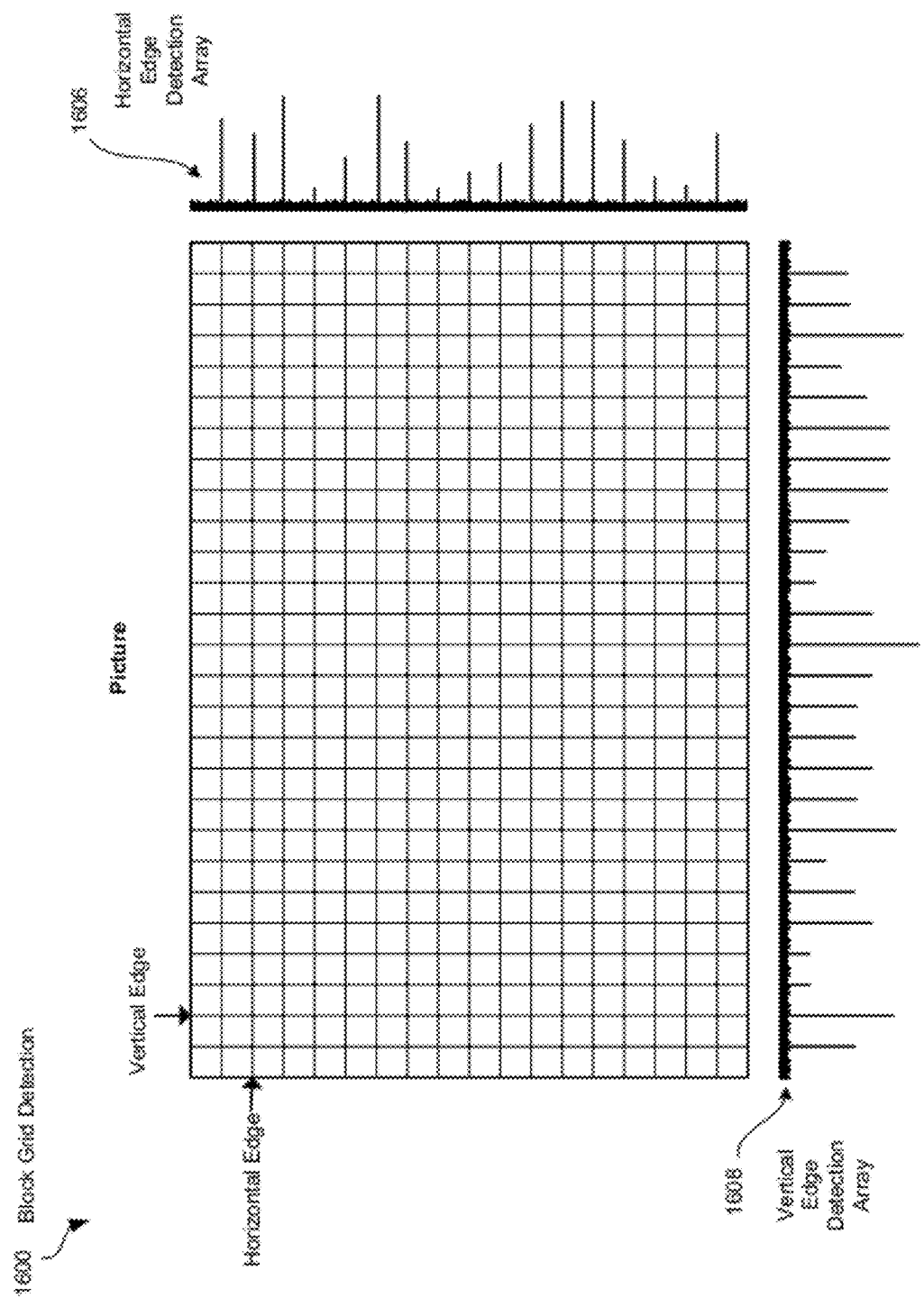
FIG. 16 is a block diagram that illustrates exemplary horizontal and vertical block grid detection arrays for a video image, in accordance with an embodiment of the invention.

FIG. 16 is a block diagram that illustrates exemplary horizontal and vertical block grid detection arrays for a video image, in accordance with an embodiment of the invention. Referring to FIG. 16, there is shown a horizontal block edge detection array 1606 and a vertical edge detection array 1608.

The horizontal block edge detection array 1606 which may be referred to as the horizontal detection array and the vertical edge detection array 1608 which may be referred to as the vertical detection array, may be similar to the detection arrays accumulated in the horizontal and vertical block edge detection array memories 1506 and 1508 described with respect to FIG. 15. The detection arrays may be as wide and/or as high as the corresponding picture and for each column and/or row, may comprise a rough estimate of the presence of a block grid boundary at that column and/or row location. In this regard, the spikes or higher levels in the detection arrays may indicate where the accumulated likelihood scores are greatest for a specified picture and may indicate where horizontal and/or vertical grid edges are located.

In an exemplary operation, for each input picture, a coarse block size may be estimated for grid line spacing along a horizontal axis and another course block size for spacing along a vertical axis. In this regard, a coarse block size may be determined by autocorrelating a detection array with a version of itself where one array is shifted by an integer block size. In this regard, a plurality of suitable integer block sizes within a specified range may be tested. The integer block size with the greatest autocorrelation score may be retained. Precision of the integer block size may then be refined into a fractional block size estimate that may still be referred to as a coarse block size. The horizontal and vertical detection arrays at the coarse block size may be utilized to determine edge strength. Edge strength may be based on the accumulated likelihood scores and a signal to noise ratio (SNR). The SNR may be determined for each direction, for example, by comparing the strength of accumulated likelihood scores for the coarse block size to the accumulated likelihood scores for the other tested block sizes.

The per-picture coarse block sizes in each direction may be filtered to determine a narrow band coarse block size based on temporal analysis. For example, in instances when coarse block size estimates for a sequence of pictures are consistent or similar from picture to picture, are above a minimum strength threshold and/or are above a minimum SNR threshold, the block grid detection system 1402, may lock to a new block size. The new block sizes may correspond to an average of the per-picture horizontal coarse block sizes and to an average of the vertical coarse block sizes in the sequence of pictures. The new block sizes may be temporally filtered by narrow band filters as the new horizontal and vertical coarse block sizes are received. The narrow band filters may output slow changing stable values that may be referred to as a narrow band coarse block size for horizontal and vertical edges.

Additional block grid size refinement may be increased, for example, to a fractional precision of $1/512$. Further refinement of the block grid size, for example, a precision of $1/4096$ may be utilized in instances of up to 250 blocks per picture. In this regard, $250/4096$ would yield a worst case pixel error of $1/16$ with regard to the location of any block edge in a picture. In this regard, the narrow band coarse block size may be utilized to spatially and/or temporally filter the per-picture detection arrays. The filtered array results may comprise arrays as wide and/or as high as the each corresponding picture and for each column and/or row in the picture, may comprise the likelihood of the presence of a block grid boundary.

The filtered detection array results may be analyzed by integrating their content for each pair of high precision block grid shift and block grid size. The high precision block sizes under test may be selected in a neighborhood of the narrow band coarse block size. The block grid shift, block grid size pair in each direction, which yields the highest integration value may be selected and referred to as the fine block grid size and/or fine block grid shift. In this regard, for a suitable block grid shift, block grid size pair, the block grid size may be near the narrow band coarse block size.

In an exemplary embodiment of the invention, as the per picture detection arrays are autocorrelated, a block noise strength may be determined. The strength measurement may be temporally filtered among pictures in a sequence for stability and may be biased to rise quickly in an instance where block noise suddenly appears. Once the block noise is found, the corresponding block grid may be tracked. The tracking may persist even in instances when the grid may disappear, for example, the block grid may intermittently disappear. In this manner, block grid detection and/or block noise reduction operations may be prepared to immediately handle spurious noise, for example, a scene change, without having to go through a process of re-syncing to a block grid.

In instances when block noise is localized in a picture, horizontal and vertical detection arrays may accumulate lower likelihood scores for locations where block noise is weak or not present. In this regard, block noise strength for the picture may be low since it may be determined based on an average of likelihood scores in each detection array for a picture. Also, since block noise strength is utilized to control or limit filter corrections in the VBNR and HBNR filters 1408 and 1410, localized noise in an image may not be filtered adequately and be perceived after block noise filtering.

To compensate for low block noise strength in pictures with localized block noise, a standard deviation, σ, of the detection array values may be utilized to modify the block noise strength where:

$$\sigma^2 = \frac{N \times \sum_N d[i]^2 - \left(\sum_N d[i]\right)^2}{N^2}$$

where N is the number of samples of accumulated likelihood scores in the detection array along the block grid and d[i] is the $i^{th}$ sample. Then, block noise strength may be modified as follows:

block noise strength=block noise strength+α*standard deviation where α may be a user adjustable parameter.

Figure 17:
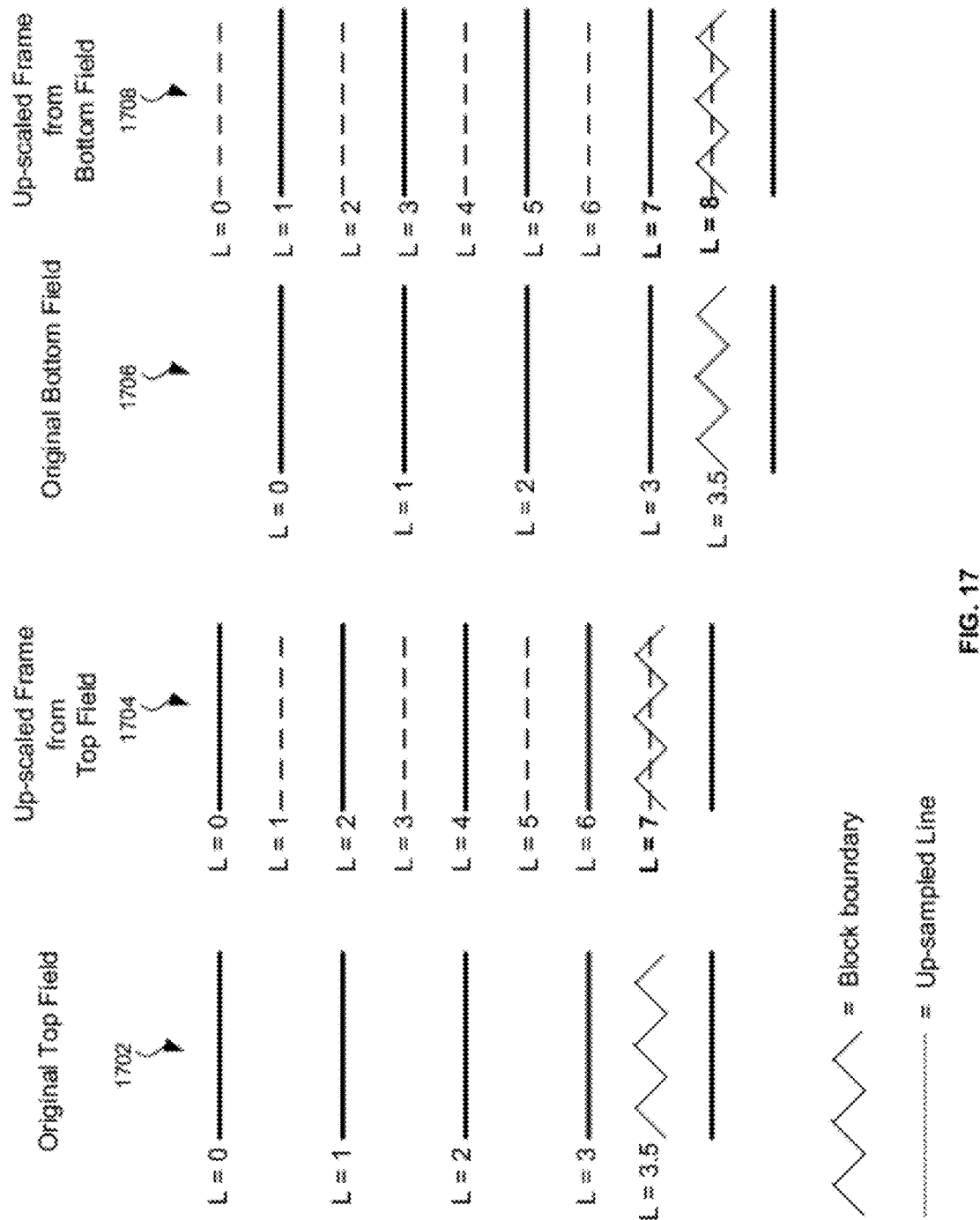
FIG. 17 is a diagram that illustrates exemplary different row shifts for interlaced and/or vertically scaled picture sequences, in accordance with an embodiment of the invention.

FIG. 17 is a diagram that illustrates exemplary different row shifts for interlaced and/or vertically scaled picture sequences, in accordance with an embodiment of the invention. Referring to FIG. 17, there is shown a portion of an original top field 1702, a portion of a frame 1704 which is up-scaled from the original top field 1702, an original bottom field 1706 and a portion of a frame 1708 which is up-scaled from the original bottom field 1706.

Block noise may be shifted when interlaced content is scaled vertically or progressive content is scaled vertically into interlaced content. In this regard, a block grid shift in the vertical direction may differ between fields of opposite polarity, for example, between top and bottom fields or frames derived from top and bottom fields.

Referring to FIG. 17, prior to performing up-scaling of the original top field 1702, a vertical block boundary may be located at a position that corresponds to line (L)3.5 which is a position located between original top field lines 3 and 4. After up-scaling the original top field 1702 to arrive at the frame 1704, the block boundary is located at line 7. Furthermore, prior to performing up-scaling of the original bottom field 1706, a vertical block boundary may be located at a position that corresponds to L 3.5. After up-scaling the original bottom field 1706 to arrive at the frame 1708, the block boundary is located at line 8. Thus, it can be seen that a block grid shift in vertically scaled pictures that may, at some time, comprise interlaced rows, may differ for alternating rows. Therefore, the BGD system 1500 may be operable to determine vertical block grid shift pictures N, N+2, N+4, . . . together to yield on block grid shift and may be operable to determine block grid shift for pictures N=1, N+3, N+5, . . . together to yield a different block grid shift.

Figure 18A:
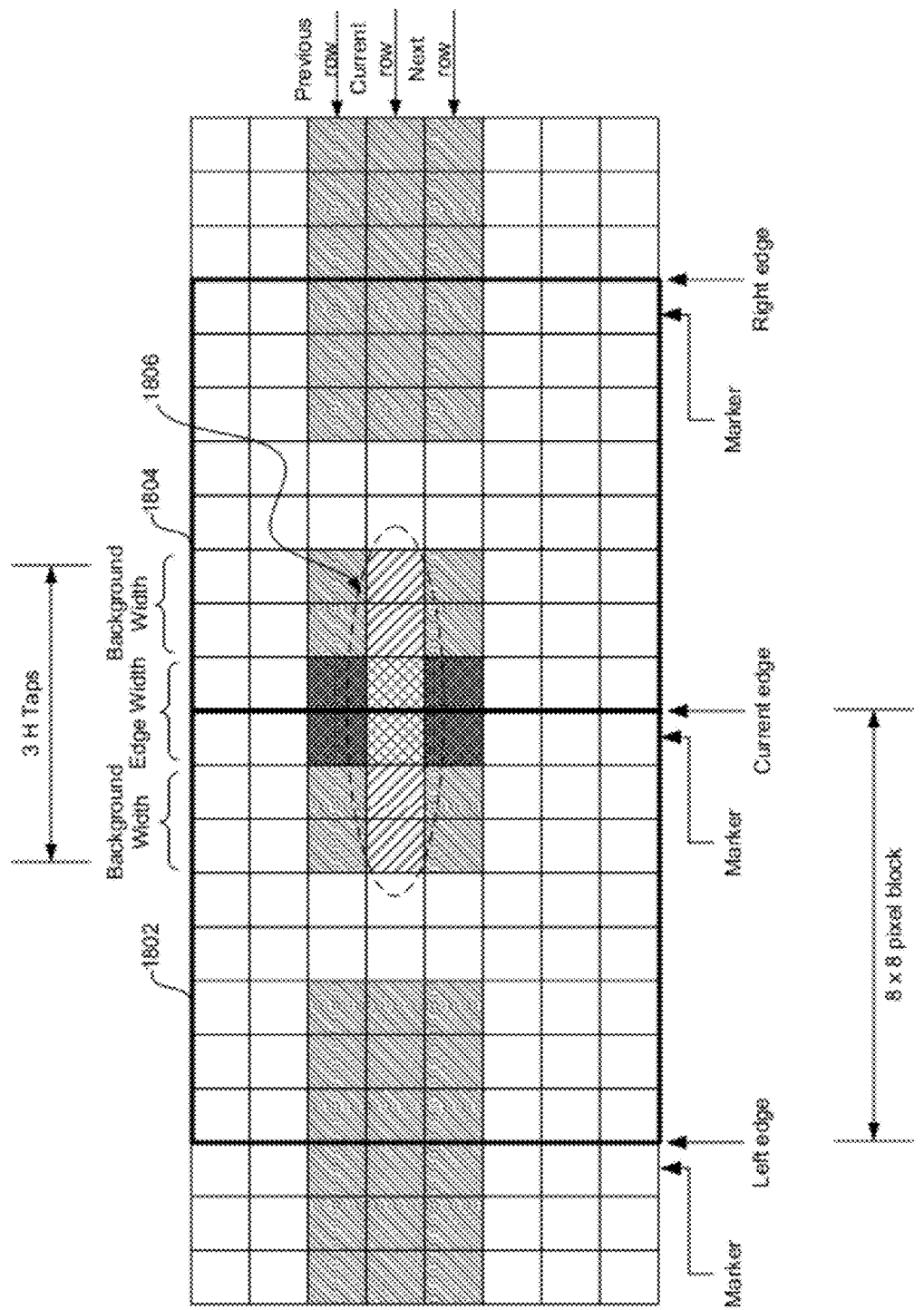
FIG. 18A illustrates an exemplary variable size, vertical edge detection region for block noise reduction, in accordance with an embodiment of the invention.

FIG. 18A illustrates an exemplary variable size, vertical edge detection region for block noise reduction, in accordance with an embodiment of the invention. Referring to FIG. 18A, there is shown a first image block 1802 adjacent to a second image block 1804 in a video image. The image blocks shown may comprise, for example, an 8×8 array of pixels. The left vertical border of image block 1802 may correspond to a left vertical edge for block noise reduction processing. The right vertical border of image block 1802, which corresponds to the left vertical border of image block 1804, may correspond to a current vertical edge for block noise reduction processing. The right vertical border of image block 1804 may correspond to a right vertical edge for block noise reduction processing. Any of the current vertical edge, the left vertical edge, or the right vertical edge may also be referred to as a vertical edge. Edge-related parameters may be determined for each of the vertical edges and may be utilized to determine whether the vertical edge that coincides with the current vertical edge may be a result of blocking artifacts.

Referring to FIG. 14, vertical edges may be detected by comparing pixels in a horizontal row and thus, vertical edges may be detected by the horizontal block edge detection and limit unit 1404 and may be filtered in the Horizontal BNR filter 1408.

Referring back to FIG. 18A, when determining edge-related parameters for any one of the vertical edges, a portion of the image comprising pixels neighboring the vertical edge may be utilized. These neighboring pixels may be referred to as background pixels and may include a plurality of pixels to the left and to the right of the selected vertical edge. The width in terms of the number of pixels utilized for the background pixels, may vary. Moreover, the width of the vertical edge may vary depending. In this regard, the number of pixels utilized within the edge width and/or in the background width, may vary depending on a scale factor determined for the image.

Referring to FIG. 18A, in an exemplary embodiment of the invention, eighteen pixels may be utilized per vertical edge. The eighteen pixels are shown as narrowly spaced hashed lined pixels for the left vertical edge and the right vertical edge. The eighteen pixels for the current vertical edge are shown as eight narrowly-spaced hashed pixels in the previous and the next rows of pixels and four widely-spaced hashed pixels in the current row of pixels for the current vertical edge. The width of the edge is indicated by cross hatched pixels. The eighteen pixels may correspond to two pixels to the left and two pixels to the right of the vertical edge in a previous row of pixels, two pixels to the left and two pixels to the right in a current row of pixels, and two pixels to the left and two pixels to the right of the vertical edge in a next row of pixels. The number of pixels utilized for determining edge parameters may depend on scale factor, the application and/or the available memory. In this regard, more or fewer than eighteen pixels may be utilized and more or fewer than three rows of pixels may be utilized when determining edge parameters. After determining the edge parameters, the widely spaced hashed-lined pixels in the current row of pixels for the current vertical edge may be further processed to reduce artifacts that may be related to block noise.

Figure 18B:
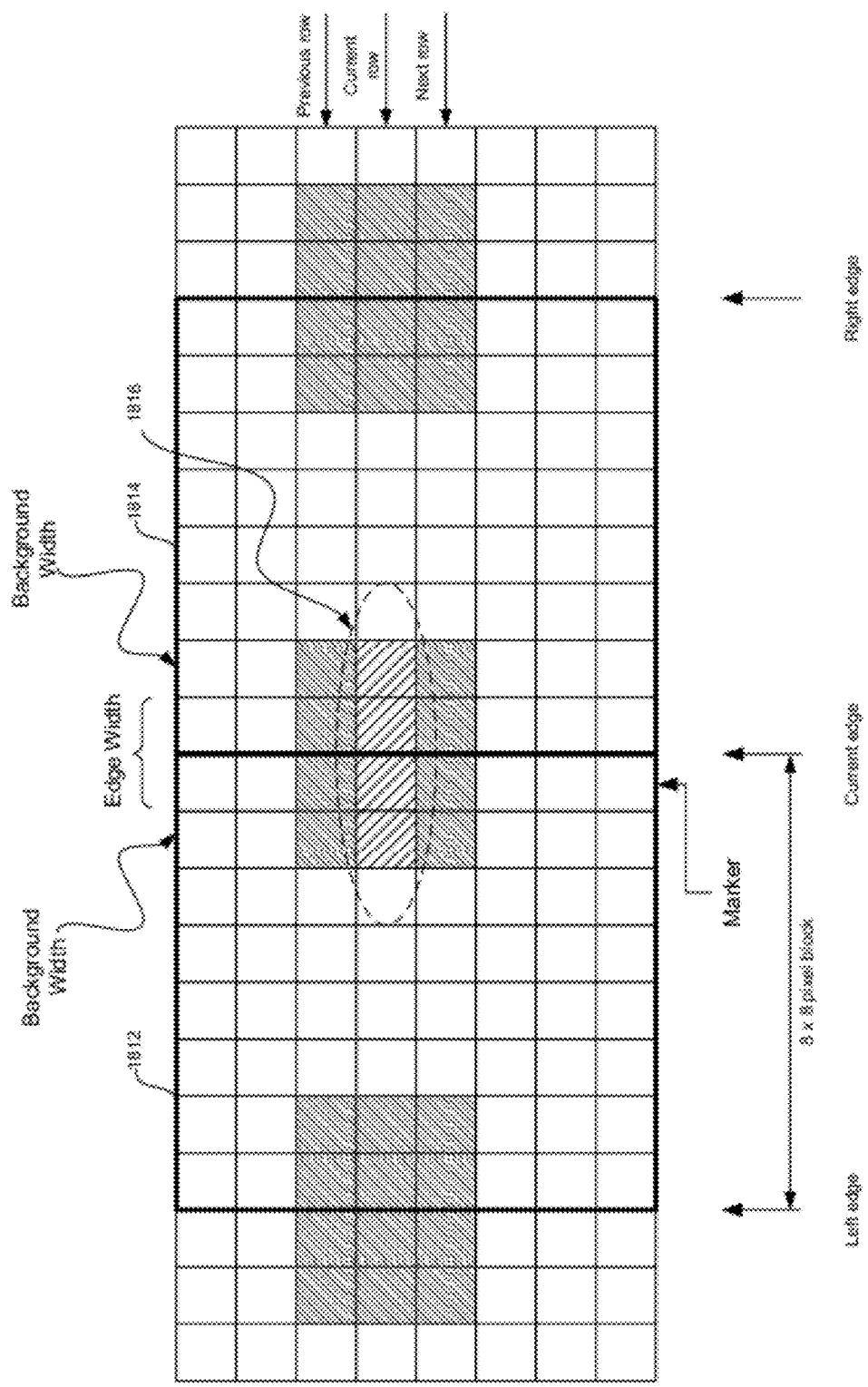
FIG. 18B illustrates an exemplary vertical edge detection region for block noise reduction, in accordance with an embodiment of the invention.

FIG. 18B illustrates an exemplary vertical edge detection region for block noise reduction, in accordance with an embodiment of the invention. Referring to FIG. 18B, there is shown a first image block 1812 adjacent to a second image block 1814 in a video image.

Similar to FIG. 18A, the right vertical, left vertical edge and current edge between the 8×8 blocks 1812 and 1814 may be referred to as vertical edges. Edge-related parameters may be determined for each of the vertical edges and may be utilized to determine whether the vertical edge that coincides with the current vertical edge may be a result of blocking artifacts.

Referring to FIG. 18B, in an exemplary embodiment of the invention, twelve pixels may be utilized per vertical edge. For the left vertical edge and right vertical edge, the twelve pixels are shown as narrowly spaced hashed lined pixels. For the current vertical edge, the twelve pixels are shown as eight narrowly-spaced hashed pixels in the previous and the next rows of pixels and as four widely-spaced hashed pixels in the current row of pixels. The width of the edge comprises two columns. The left background comprises one column of three pixels and the right background comprises one column of three pixels. The twelve pixels may correspond to four pixels in a previous row of pixels, four pixels in a current row of pixels, and four pixels in a next row of pixels. After determining the edge parameters, the widely spaced hashed-lined pixels in the current row of pixels for the current vertical edge may be further processed to reduce artifacts that may be related to block noise.

FIG. 19A illustrates an exemplary image portion for vertical edge detection, in accordance with an embodiment of the invention. Referring to FIG. 19A, there is shown a region of pixels 1900.

The region of pixels 1900 may be utilized for determining a plurality of edge-related parameters for a vertical edge. As shown in FIG. 18B, the edge may be two pixels wide and each of the left and right background widths may be one pixel wide. The pixels may be labeled A0, B0, C0, and D0 for the previous row of pixels, A1, B1, C1, and D1 for the current row of pixels, and A2, B2, C2, and D2 for the next row of pixels. A vertical edge variance parameter for the vertical edge being processed may be determined by utilizing, for example, the following expression:

$$\text{edge\_var} = ABS(B0-C0) + ABS(B1-C1) + ABS(B2-C2),$$

where ABS corresponds to an absolute value operation. A background variance parameter for the image portion defined in FIG. 19A may be determined by utilizing, for example, the following expression:

$$\text{backgnd\_var} = MAX[(ABS(A0-B0) + ABS(A1-B1) + ABS(A2-B2)),$$

$$(ABS(C0-D0) + ABS(C1-D1) + ABS(C2-D2))]$$

where the first value in the MAX operation corresponds to a left vertical variance parameter and the second value in the MAX operation corresponds to a right vertical variance parameter.

A first edge strength parameter (edge_strength) and a second edge strength parameter (edge_strength2) may be determined based on the edge variance parameter and the background variance parameter. For example, the first and second edge strength parameters may be determined as follows:

edge_strength=edge_var−$b$_rel*backgnd_var/4, edge_strength2=edge_var−2*$b$_rel*backgnd_var/4, where b_rel is a relative weight parameter that may be utilized to control the variance of the edge relative to the background and 4 may correspond to an exemplary scaling factor. In this regard, different values of b_rel may be used to adjust sensitivity. For example, smaller values of b_rel may result in stronger edge strengths and may allow for more filtering.

For each vertical edge, a maximum vertical parameter may be determined by the following exemplary expression:

vert_max=MAX[ABS($B$0−$C$0),ABS($B$1−$C$1),ABS($B$2−$C$2)].

Moreover, a first vertical edge clamping limit (limit) and a second vertical edge clamping limit (limit2) may be determined for every vertical edge based on edge strength values, the maximum vertical parameter, and a block core limit (b_core). The value of b_core may be determined so as to prevent filtering of very strong edges that are likely to be the result of image content. Exemplary expressions for determining the first and second vertical edge clamping limit may be as follows:

limit=MIN[edge_strength,($b$_core−vert_max)], limit2=MIN[edge_strength2,($b$_core−vert_max)].

The value of b_core may be configurable, for example, in a programmable register. For example, larger values of b_core may allow filtering of stronger edges. The values for limit and limit2 may be determined for the current vertical edge, for the left vertical edge, and/or for the right vertical edge. In this regard, the limits for the current vertical edge may be referred to as current vertical edge clamping limits, the limits for the left vertical edge may be referred to as left vertical edge clamping limits, and the limits for the right vertical edge may be referred to as right vertical edge clamping limits.

The clamping limits for the current vertical edge, the left vertical edge, and the right vertical edge may be combined to provide a first vertical combined clamping limit (combined_limit) based on the values of limit for the vertical edges and a second vertical combined clamping limit (combined_limit2) based on the values of limit2 for the vertical edges. In this regard, the first and second vertical combined clamping limits may be utilized for processing the pixels in the current row of pixels for the current vertical edge. The values of combined_limit and combined_limit2 may be determined by the following exemplary expressions:

temp=MAX[limit_left,limit_right]+$b$_core/8, temp2=MAX[limit2_left,limit2_right]+$b$_core/8, if (temp<lower_limit){temp=lower_limit} if (tepm2<lower_limit2){temp2=lower_limit2} combined_limit=MIN(temp,limit_current), combined_limit2=MIN(temp2,limit_current2), where temp corresponds to a temporary variable for storing the maximum of the first left vertical edge clamping limit (limit_left) and the first right vertical edge clamping limit (limit_right), temp2 corresponds to a temporary variable for storing the maximum of the second left vertical edge clamping limit (limit_left2) and the second right vertical edge clamping limit (limit_right2), lower_limit and lower_limit2 may correspond to lower limits that may be allowed for temp and temp2 respectively, MIN corresponds to a minimum value operation, limit_current corresponds to the first current vertical edge clamping limit, limit_current2 corresponds to the second current vertical edge clamping limit, and 8 is an exemplary scaling factor. The values of lower_limit and lower_limit2 may be selected to, for example, avoid negative vertical combined clamping limit values.

FIG. 19B illustrates an exemplary notation that may be utilized for vertical edge filtering, in accordance with an embodiment of the invention. Referring to FIG. 19B, there is shown pixels labeled A, B, C, and D that are located in a current row of pixels in the current vertical edge. In this regard, the pixel labeled B is located to the left of the current vertical edge and the pixel A is located to the left of the pixel labeled B. Similarly, the pixel labeled C is located to the right of the current vertical edge and the pixel labeled D is located to the right of the pixel labeled C.

The values of the pixels labeled A, B, C, and D may be filtered and the new filtered values A', B', C', and D' may be given as:

$A'$=(13$A$+3$C$+8)/16, $B'$=(10$B$+6$C$+8)/16, $C'$=(6$B$+10$C$+8)/16, and $D'$=(3$B$+13$D$+8)/16.

A difference parameter may be determined based on an original pixel value (original_pix) and a filtered pixel value (filt_pix). For example, the difference parameter may be determined by:

diff=filt_pix−original_pix.

A vertical block noise reduction difference parameter (VBNR_diff) may be determined based on the difference parameter and the clamping limits. An exemplary VBNR_diff may be determined as follows:

---
if (pixel position corresponds to pixel labeled A or D)
   { VBNR_diff = CLAMP(diff, −combined_limit2,
     +combined_limit2) }
else if (pixel position correspond to pixel labeled B or C)
   { VBNR_diff = CLAMP(diff, −combined_limit,
     +combined_limit) }
else
   { VBNR_diff = 0 }
--- where CLAMP may correspond to a clamping or limiting operation. Limiting the filtering operation may be performed to ensure that strong vertical edges may be filtered while very strong vertical edges may not be filtered since they may correspond to image content. The limits may be soft and may have gradual turn-offs. Edges that occur in relatively flat backgrounds may affect all of the pixels labeled A, B, C, and D. However, the when noisier backgrounds occur, the filtering may be limited so that only the pixels labeled B and C may be adjusted.

Figure 20:
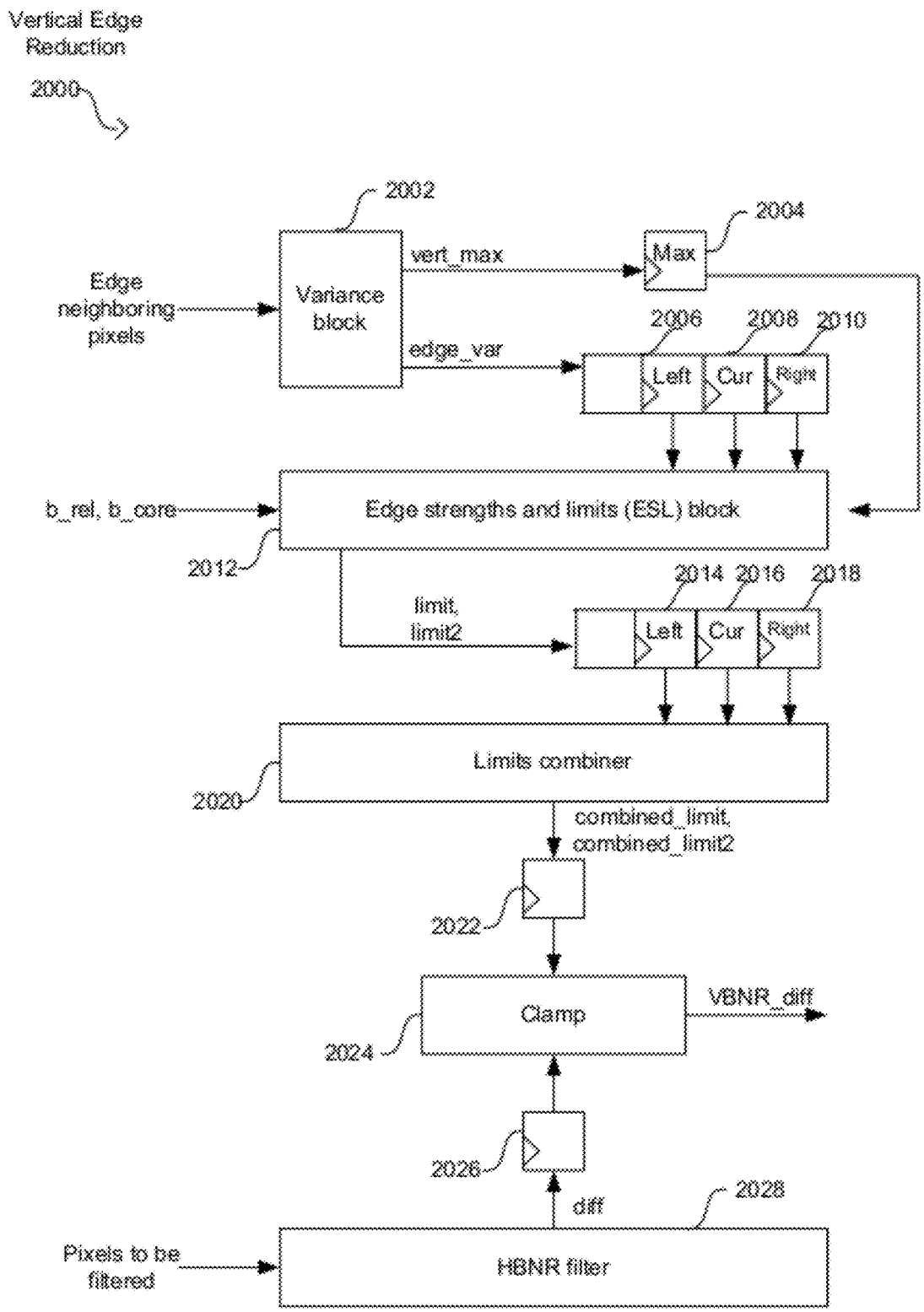
FIG. 20 is a block diagram of an exemplary vertical edge block noise reduction (BNR) system, in accordance with an embodiment of the invention.

FIG. 20 is a block diagram of an exemplary vertical edge block noise reduction (BNR) system, in accordance with an embodiment of the invention. Referring to FIG. 20, there is shown a vertical edge reduction system 2000 which may comprise a variance block 2002, a max latch 2004, a left FIFO position 2006, a current FIFO position 2008, a right FIFO position 2010, an edge strengths and limits (ESL) block 2012, a left FIFO position 2014, a current FIFO position 2016, a right FIFO position 2018, a limits combiner 2020, a latch 2022, a clamping block 2024, a latch 2026, and a block noise reduction (BNR) filter 2028.

The variance block 2002 may comprise suitable logic, circuitry, and/or code that may be adapted to determine a vertical edge variance parameter (edge_var) and a maximum vertical edge parameter (vert_max) for a vertical edge being processed. The max FIFO position 2004, the left FIFO position 2006, the current FIFO position 2008, the right FIFO position 2010, the left FIFO position 2014, the current FIFO position 2016, the right FIFO position 2018, the latch 2022, and the latch 2026 may comprise suitable logic and/or circuitry that may be adapted to store information. The variance block 2002 may transfer the value of vert_max to the max latch 2004 and the value of edge_var to the left FIFO position 2006. The value in left FIFO position 2006 may be transferred to current FIFO position 2008 and then from the current FIFO position 2008 to the right FIFO position 2010. For example, after three clock cycles the variance block 2002 may have determined the edge_var and vert_max values for a current vertical edge, a left vertical edge, and a right vertical edge. In instances where the edge width and/or the background width comprise a greater number of pixels, for example, as shown in FIG. 18A, a greater number of clock cycles may be needed to determine the edge_var and vert_max values.

The edge strengths and limits (ESL) block 2012 may comprise suitable logic, circuitry, and/or code that may be adapted to receive the vertical edge variance parameters and the maximum vertical parameters for the current vertical edge, the left vertical edge, and the right vertical edge and determine the edge strength parameters (edge_strength, edge_strength2) and the vertical edge clamping limits (limit, limit2) for each of these vertical edges. In this regard, the ESL block 2012 may utilize a relative weight parameter (b_rel) and/or a block core limit (b_core) during processing. The ESL block 2012 may transfer the values for the vertical edge clamping limits to the left FIFO position 2014. The value in the left FIFO position 2014 may be transferred to the current FIFO position 2016 and then from the current FIFO position 2016 to the right FIFO position 2018. The limits combiner 2020 may comprise suitable logic, circuitry, and/or code that may be adapted to receive the right vertical edge clamping limits, the current vertical edge clamping limits, and the right vertical edge clamping limits and determine the first vertical combined clamping limit (combined_limit) and the second vertical combined clamping limit (combined_limit2) to be utilized with the pixels labeled A, B, C, and D in FIG. 19B. The limits combiner 2020 may be adapted to transfer the values for combined_limit and combined_limit2 to the latch 2022. The latch 2022 may be adapted to transfer the values of combined_ limit and combined_limit2 to the clamping block 2024.

The BNR filter 2028 may comprise suitable logic, circuitry, and/or code that may be adapted to filter the original values of the pixels labeled A, B, C, and D in a horizontal row shown in FIG. 18B and to determine a difference parameter (diff) based on a difference between original and filtered values. The values of the filter coefficients utilized by the BNR filter 2028 may be programmable. The values of the filter coefficients and the number of taps utilized may depend on scale factor and on the widths of the vertical edge and the background pixels, as shown in FIGS. 18A and 18B. The BNR filter 2028 may be adapted to transfer the value of the difference parameter to the latch 2026. The latch 2026 may be adapted to transfer the value of the difference parameter to the clamping block 2024.

The clamping block 2024 may comprise suitable logic, circuitry, and/or code that may be adapted to determine the vertical block noise reduction difference parameter (VBNR_ diff) based on the values of combined_limit, combined_ limit2, and diff. In this regard, the clamping block 2024 may clamp or limit the value of the difference parameter based on the value of combined_limit when processing the pixels labeled B or C in FIG. 18B. Moreover, the clamping block 2024 may clamp or limit the value of the difference parameter based on the value of combined_limit2 when processing the pixels labeled A or D in FIG. 18B. The clamping block 2024 may be adapted to transfer the value of VBNR_diff to the combiner 1412 in FIG. 14.

In instances when an image may be up-scaled, the vertical edge and/or background pixel widths may be wider, for example, as shown in FIG. 18A, the vertical edge is two pixels wide and each of the left and right background widths are two pixels wide. In another exemplary embodiment of the invention, the edge width may be four pixels wide and the left and right background widths may each be four pixels wide. Furthermore, the block dimensions which may be indicated by the block edge markers may be greater than 8×8 pixels. In this regard, the vertical edge strength (Edge_strength) may be determined, for example, based on the absolute difference between each pair combination of horizontally neighboring pixels in each row within the vertical edge width. The vertical background strength (Background_strength) may be determined, for example, based on the absolute difference between each pair combination of horizontally neighboring pixels within the background and on the horizontal pairs comprising one vertical edge pixel and one background pixel. The Edge_strength and Background_strength may be utilized to compute a limit as follows:

$$\text{Limit}=\text{Edge\_strength}-(\text{Background\_strength}*BREL)/256$$

$$\text{Limit}=\text{MAX}(\text{limit},0)$$

where BREL may be a configurable parameter.

A Limit may be performed at every marker. For a current vertical edge, confidence may be improved by determining a limit for a vertical edge to the left and a vertical edge to the right of the current vertical edge. Also, scale factor may be utilized to determine a limit. For example, for each marker, four limits may be determined as follows:

$$\text{Limit\_left}=(\text{limit\_left}*LR\_\text{SCALE})/32;$$

$$\text{Limit\_right}=(\text{limit\_right}*LR\_\text{SCALE})/32;$$

$$\text{H\_limit}=\text{MIN}(\text{current\_limit},\text{MAX}(\text{limit\_left},\text{limit\_right}));$$

where H_limit is a limit that may be utilized to limit horizontal filter corrections when reducing vertical edge noise in horizontal filters, current limit is the limit determined for the current vertical edge, limit_right is the limit determined for the right vertical edge, limit_left is the limit determined for the left vertical edge and LR_SCALE is parameter determined based on the scale factor in the horizontal direction which is determined for the current picture. The LR_SCALE may be utilized to normalize limit values. In this regard, the limits may be determined over variable edge widths, variable background widths and over variable block widths. The LR_SCALE parameter may enable more consistent results across various scale factors.

Figure 21A:
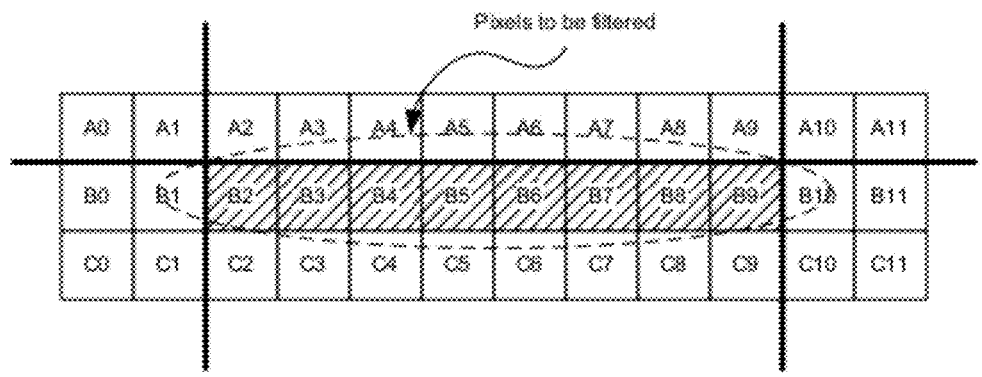
FIGS. 21A-21C illustrate exemplary vertical and/or horizontal detection, in accordance with an embodiment of the invention.
Figure 21B:
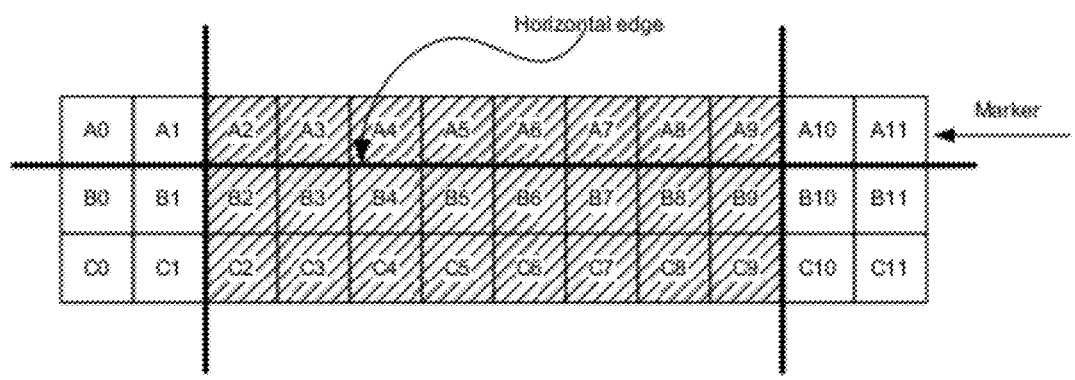
Figure 21C:
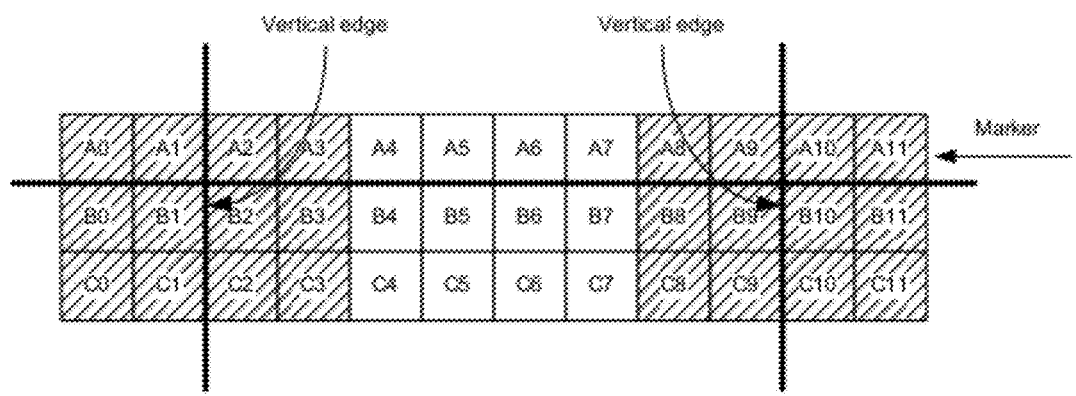

FIGS. 21A-21C illustrate exemplary vertical and/or horizontal detection, in accordance with an embodiment of the invention. Referring to FIG. 21A, there is shown a region of an image that comprises a top border of an image block with a top row of pixels that comprises the pixels labeled B2 through B9. The top row of pixels of the image block is indicated by widely spaced hashed lines. When a horizontal edge is detected, the pixels labeled B2 through B9 in the top row of the image block that is adjacent to the horizontal edge may be filtered to reduce the effect of block noise. Referring to FIG. 21B, there is shown an exemplary region of the image that may be utilized for detecting a horizontal edge adjacent to the top border of an image block. The region comprises the pixels labeled A2 through A9, the pixels labeled B2 through B9, and the pixels labeled C2 through C9. Widely spaced hashed lines indicate the pixels in the detection region.

Referring to FIG. 21C, to detect the presence of a horizontal edge at the top border of an image block, at least one vertical edge on a vertical border of the image block may also be selected. There is shown in FIG. 21C exemplary regions of the image that may be utilized for detecting at least one vertical edge on a vertical border of the image block. For the left vertical border, the exemplary region may comprise the pixels labeled A0 through A3, the pixels labeled B0 through B3, and the pixels labeled C0 through C3. For the right vertical border, the exemplary region may comprise the pixels labeled A8 through A11, the pixels labeled B8 through B11, and the pixels labeled C8 through C11. Widely spaced hashed lines indicate the pixels in the detection region. While FIGS. 21A-21C indicate an exemplary approach that may be followed for detecting the presence of a horizontal edge adjacent to the top row of pixels in the image block, a similar approach may also be followed for detecting the presence of a horizontal edge adjacent to the bottom row of pixels in the image block.

Referring to FIG. 14, horizontal edges may be detected by comparing pixels in a vertical column and thus, horizontal edges may be detected by the vertical block edge detection and limit unit 1406 and may be filtered in the Vertical BNR filter 1410.

Referring to FIG. 21C, a horizontal edge variance parameter may be determined for the horizontal edge being processed by computing for every image block and for vertical pixel pair combinations that fall within the detection region, the following exemplary expressions:

$$\text{vvar\_top}=\text{SUM}[\text{ABS}(Ax-Bx)],$$

$$\text{vvar\_bottom}=\text{SUM}[\text{ABS}(Bx-Cx)],$$

$$\text{max\_top}=\text{MAX}[\text{ABS}(Ax-Bx)],$$

$$\text{max\_bottom}=\text{MAX}[\text{ABS}(Bx-Cx)],$$

where SUM corresponds to an addition operation, vvar_top is a top block variance parameter, vvar_bottom is a bottom block variance parameter, max_top is a maximum top block variance, and max_bottom is a maximum bottom block variance. The computations may be performed cumulatively over every horizontal edge. For example, the values for vvar_top, vvar_bottom, maxt_top, and max_bottom may be determined for all columns of pixels in a horizontal edge along the block. These values may be determined serially as the pixels are shifted through a pixel buffer. Once these values are determined, they may be stored for further processing.

For pixels in a row of pixels that is above a horizontal edge in a top field or above a horizontal edge in a progressive frame, a current horizontal edge clamping limit (limit) may be determined by the following expression:

$$\text{limit}=\text{vvar\_top}-b\_\text{rel}*\text{vvar\_bottom}/4,$$

where b_rel is a relative weight parameter and 4 corresponds to an exemplary scaling factor. For pixels in a row of pixels that is below a horizontal edge in a bottom field or below a horizontal edge in a frame when progressive video is utilized, a current horizontal edge clamping limit (limit) may be determined by the following expression:

$$\text{limit}=\text{vvar\_bottom}-b\_\text{rel}*\text{vvar\_top}/4,$$

where b_rel is again the relative weight parameter and 4 corresponds to an exemplary scaling factor. In any other instance, the value of the current horizontal edge clamping limit (limit) may be set to zero. The value of the parameter limit may also be scaled and further limited by the following expressions:

$$\text{limit}=\text{limit}/4,$$

$$\text{limit}=\text{MIN}[\text{limit},b\_\text{core}-\text{max\_vvar}],$$

where b_core may be determined so as to prevent filtering of very strong edge that are likely to be the result of image content, and max_vvar corresponds to the value of max_top when the bottom row of pixels in an image block for bottom fields or progressive video are to be filtered and max_vvar corresponds to the value of max_bottom when the top row of pixels in an image block for top fields or progressive video are to be filtered.

For the currently selected image block, the HBEL block 1404 may have been used to determined a left vertical edge clamping limit (limit_left) and a current vertical edge clamping limit (limit_current) that may be utilized for determining whether vertical edges also exist in the current image block. In this regard, a current vertical-horizontal edge clamping limit (hlimit) may be determined as follows:

$$\text{hlimit}=\text{MAX}[\text{limit\_left},\text{limit\_current}].$$

When portions of a horizontal edge extend beyond the boundaries of a video image, the horizontal edge may not be filtered. When a horizontal edge starts and/or ends in a video image boundary, and/or close to the video image boundary, it may only have one vertical edge. In this instance, the value of the parameter hlimit may be set to the vertical edge clamping limit value of the existing vertical edge.

The value of the current horizontal edge clamping limit (limit) and the value of the current vertical-horizontal edge clamping limit (hlimit) may be combined to determine a horizontal combined clamping limit (combined_limit) based on the following expression:

$$\text{combined\_limit}=\text{MIN}[\text{limit},\text{hlimit}],$$

$$\text{if (combined\_limit}<0)\{\text{combined\_limit}=0\}.$$

A filter may be applied to the pixels in the row adjacent to the horizontal edge. For the top row of pixels in an image block comprising top a field or progressive video, the exemplary value of a filtered pixel (filt_pixel) may be given by the following expression:

$$\text{filt\_pixel}=(B*5+A*3+4)/8,$$

where B corresponds to the value of the B-labeled pixels, A corresponds to the value of the corresponding A-labeled pixels, and 8 is an exemplary scaling factor. For the bottom row of pixels in an image block for bottom fields or progressive video, the exemplary value of a filtered pixel (filt_pixel) may be given by the following expression:

$$\text{filt\_pixel} = (B*5 + C*3 + 4)/8,$$

where B corresponds to the value of the B-labeled pixels, C corresponds to the value of the corresponding C-labeled pixels, and 8 is an exemplary scaling factor. A difference parameter may be determined based on an original pixel value (original_pix) and a filtered pixel value (filt_pix). For example, the difference parameter may be determined by:

$$\text{diff} = \text{filt\_pix} - \text{original\_pix}.$$

A horizontal block noise reduction difference parameter (HBNR_diff) may be determined based on the difference parameter and the horizontal combined clamping limit (combined_limit). An exemplary HBNR_diff may be determined as follows:

$$\text{HBNR\_diff} = \text{CLAMP}(\text{diff}, -\text{combined\_limit}, +\text{combined\_limit})$$

where CLAMP may correspond to a clamping or limiting operation.

Figure 22:
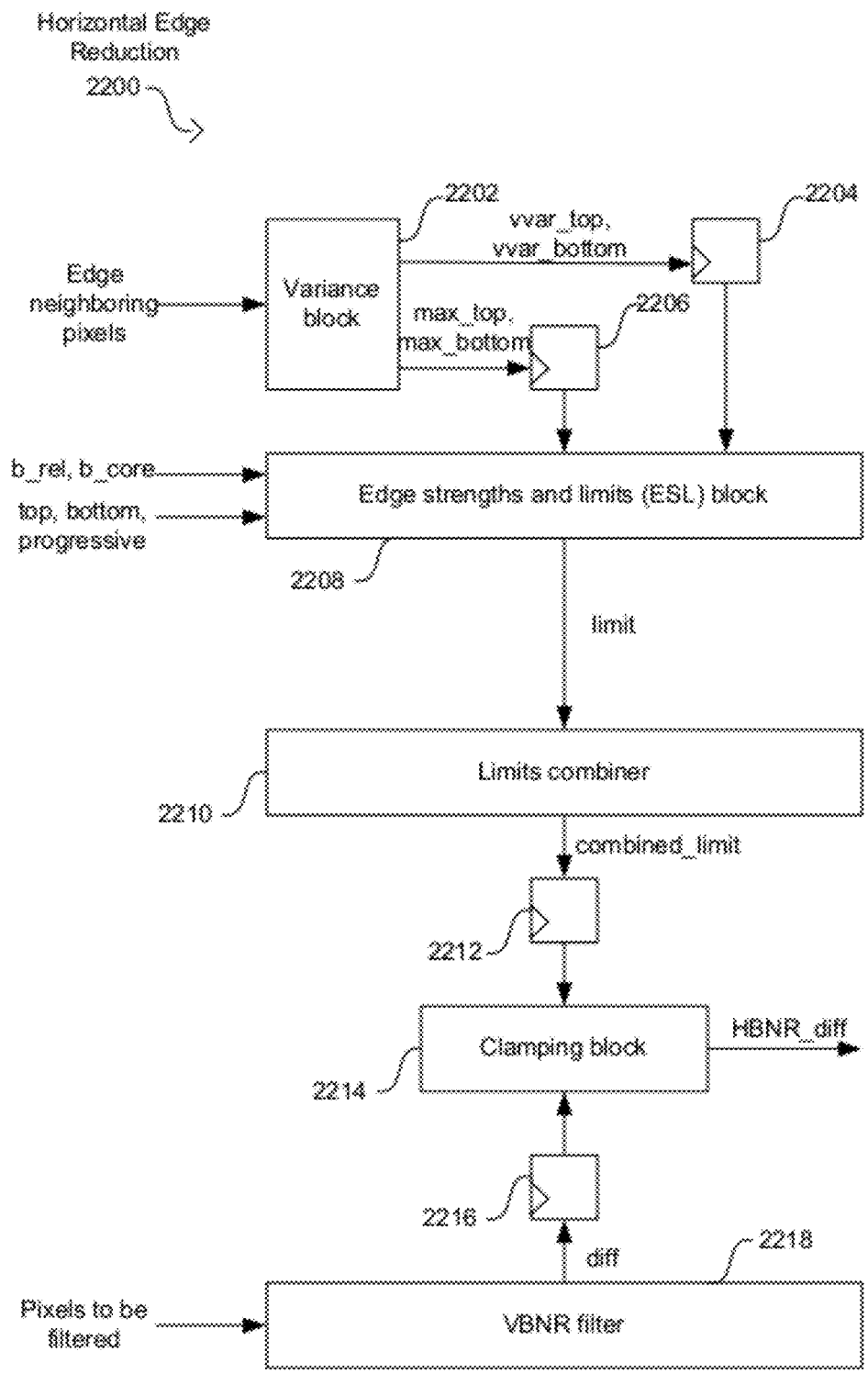
FIG. 22 is a block diagram of an exemplary horizontal edge block noise reduction block, in accordance with an embodiment of the invention.

FIG. 22 is a block diagram of an exemplary horizontal edge block noise reduction block, in accordance with an embodiment of the invention. Referring to FIG. 22, the VBEL block 1406 in FIG. 14 may comprise a variance block 2202, a latch 2204, a latch 2206, an edge strengths and limits (ESL) block 2208, a limits combiner 2210, a latch 2212, a clamping block 2214, a latch 2216, and the VBNR filter 1410 may comprise a filter 2218. The variance block 2202 may comprise suitable logic, circuitry, and/or code that may be adapted to determine the parameters vvar_top, vvar_bottom, max_top, and max_bottom for a horizontal edge being processed. The latches 2204, 2206, 2212, and 2216 may comprise suitable logic and/or circuitry that may be adapted to store information. The variance block 2202 may transfer the values of vvar_top and vvar_bottom to the latch 2204 and the values of max_top and max_bottom to the latch 2206.

The ESL block 2208 may comprise suitable logic, circuitry, and/or code that may be adapted receive the horizontal edge parameters stored in the latches 2204 and 2206 to determine the value of the current horizontal edge clamping limit (limit). In this regard, the ESL block 2208 may utilize the relative weight parameter (b_rel), the block core limit (b_core) during processing, and/or information regarding whether the video signal is interlaced video and the current field is a top field or bottom field or whether the video signal is progressive video. The ESL block 2208 may transfer the value for the current horizontal edge clamping limit to the limits combiner 2210. The limits combiner 2210 may comprise suitable logic, circuitry, and/or code that may be adapted to receive the current horizontal edge clamping limit, the current vertical edge clamping limit, and the left vertical edge clamping limit to determine the horizontal combined clamping limit (combined_limit) to be utilized with the pixels in the row of pixels adjacent to the horizontal edge. The limits combiner 2210 may be adapted to transfer the values for combined_limit to the latch 2212. The latch 2212 may be adapted to transfer the values of combined_limit to the clamping block 2214.

The VBNR filter 2218 may comprise suitable logic, circuitry, and/or code that may be adapted to filter the original values of the pixels in the row of pixels adjacent to the horizontal edge and to determine a difference parameter (diff) based on the original and filtered values. The values of the filter coefficients utilized by the VBNR filter 2218 may be programmable via, for example, the host processor 204 and/or via a register direct memory access (DMA). The VBNR filter 2218 may be adapted to transfer the value of the difference parameter to the latch 2216. The latch 2216 may be adapted to transfer the value of the difference parameter to the clamping block 2214. The clamping block 2214 may comprise suitable logic, circuitry, and/or code that may be adapted to determine the horizontal block noise reduction difference parameter (HBNR_diff) based on the values of combined_limit and diff. The clamping block 2214 may be adapted to transfer the value of HBNR_diff to the combiner 1412 shown in FIG. 14.

When processing the first and last vertical edges in a video image, that is, the picture border or boundary, filtering may not be utilized. In this regard, the vertical combined edge clamping limits may be set to zero, for example. When processing the next to the first and next to the last vertical edges in a video image, the values of temp and temp2 may be set to b_core/4, for example.

Figure 23:
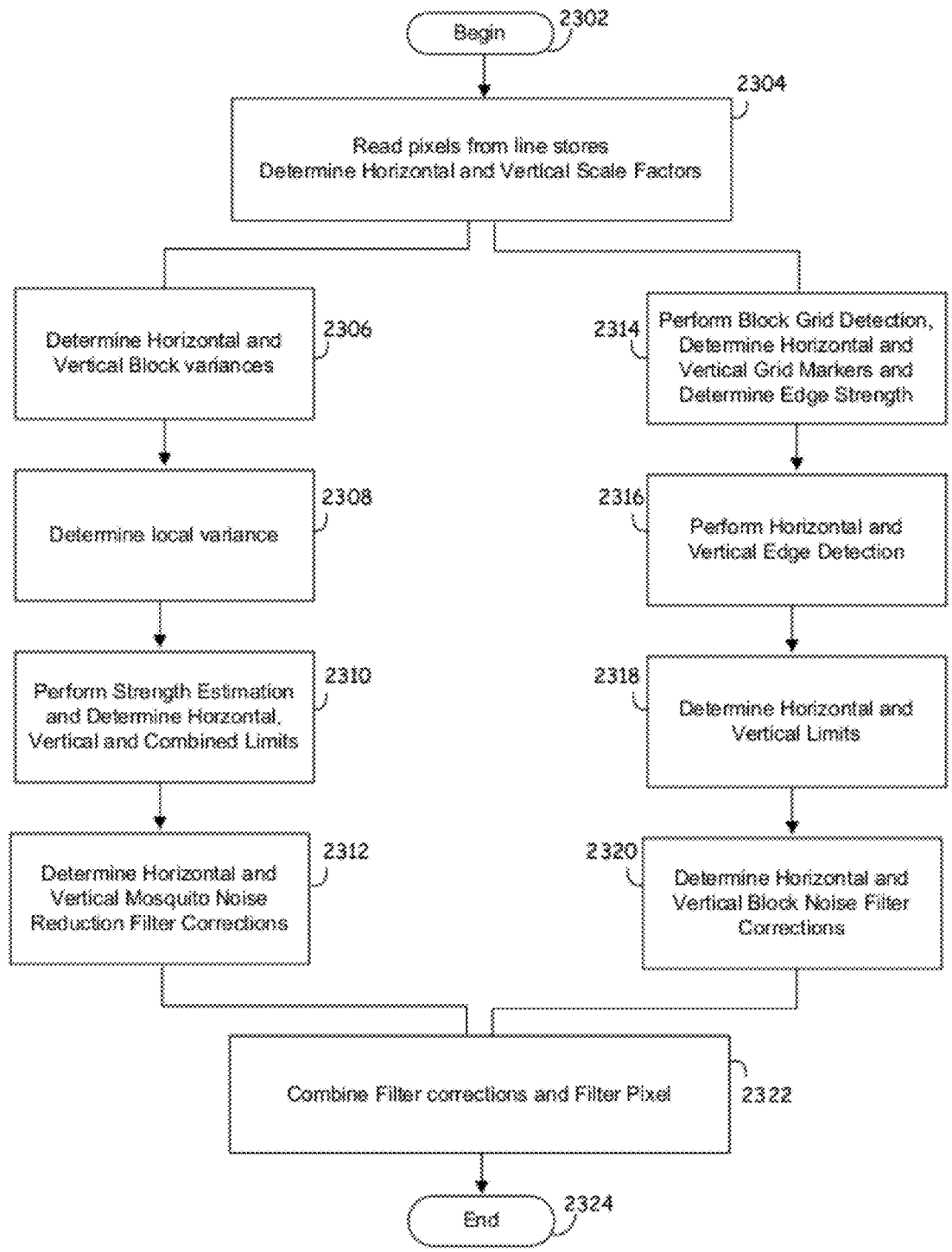
FIG. 23 is a flow chart illustrating exemplary steps for performing mosquito noise and block noise reduction in images that have been compressed prior to scaling, in accordance with an embodiment of the invention.

FIG. 23 is a flow chart illustrating exemplary steps for performing mosquito noise and block noise reduction in images that have been compressed prior to scaling, in accordance with an embodiment of the invention. Referring to FIG. 23, the exemplary steps may begin at step 2302. In step 2304, pixels may be read from the line stores 204. The SFD 206 may determine horizontal and/or vertical scale factors that may be utilized for mosquito noise detection 104, mosquito noise filtering 106, block grid detection 108 and block grid filtering 110. In step 2306, horizontal and/or vertical block variances may be determined by the MNR block variance unit 710. In step 2308, local variance may be determined by the MNR local variance block 730. In step 2310, The MNSE unit 1108 may perform mosquito noise strength estimation and may determine horizontal, vertical and combined limits. In step 2312, the MNR filter 1202 may determine horizontal and vertical mosquito noise reduction filter corrections. In step 2314, the block grid detection unit 1402 and/or the block grid detection system 1500 may perform block grid detection, may determine horizontal and vertical grid markers and may determine block edge strength. In Step 2316, the horizontal and vertical block edge detection and limit units 1404 and 1406 may perform horizontal and vertical edge detection. In step 2318, the horizontal and vertical block edge detection and limit units 1404 and 1406 may determine horizontal and vertical limits. In step 2320, the HBNR filter 1408 and VBNR 1410 may determine horizontal and vertical block noise filter corrections. In step 2322, the combiner 1412 may combine MNR and/or BNR filter corrections and may filter pixels. The exemplary steps may end at step 2324.

In an embodiment of the invention, in a video processing device, scale may be detected in a video image by the SFD 206, for example. The scale may be detected in one or both of vertical direction and horizontal direction based on pixel information for the video image. The scale may be detected utilizing pixel information from the video image. One or both of a first video noise reduction operation, for example, mosquito noise strength estimation and/or mosquito noise reduction and a second video noise reduction operation, for example, block grid detection and/or block noise reduction, may be controlled based on the detected scale which are utilized for processing at least a portion of the video image. A pixel correction value may be generated based on one or both of results from the first video noise reduction operation and results from the second video noise reduction operation. The results from the first video noise reduction operation and the results from the second video noise reduction operation may be blended to generate the pixel correction value. At least one pixel value may be corrected for the video image utilizing the generated pixel correction value. The first video noise reduction operation and the second video noise reduction operation may comprise mosquito noise reduction and block noise reduction. The scale may be determined based on one or both of a per pixel vertical gradient measurement and a per pixel horizontal gradient measurement. Which gradient measurements to utilize and/or which gradient measurements to discard, may be determined based on one or more of the following: configured picture format information associated with the video image, for example, stored in memory, standard deviation of luma levels in one or both of a vertical window and a horizontal window about a current pixel of said video image, and a current pixel location relative to edges of black borders, graphics and/or overlaid content associated with said video image.

During one or both of the first video noise reduction operation and the second video noise reduction operation, horizontal operations which may correspond to the horizontal direction may be performed separately from vertical operations which may correspond to the vertical direction for one or more operations comprising: detecting horizontal and vertical edges, determining strength of horizontal and vertical edges, filtering horizontal and vertical edges and controlling the amount of horizontal filtering and the amount of vertical filtering, for example, in one or both of the mosquito noise detection unit 104, the mosquito noise reduction unit 106, the block grid detection unit 108 and the block noise reduction unit 110. Mosquito noise detection may be referred to as mosquito strength estimation. Horizontal filtering and/or vertical filtering may be adapted based on the determined horizontal direction scale, the determined vertical direction scale and/or the determined strength of the horizontal and/or the vertical edges. The results from one or both of the first video noise reduction operation and the second video noise reduction operation may be determined based on one or more of: selecting a weakest filter correction from a median filter 1206 and one or more linear filters 1210 and 1214, blending filter corrections from a median filter and one or more linear filters 1210 and 1214 and selecting a strongest filter correction from a median filter and one or more linear filters 1210 and 1214. Horizontal spacing of a block noise grid, vertical spacing of a block noise grid, horizontal shift of a block noise grid, vertical shift of a block noise grid and/or block noise strength may be determined during one or both of the first video noise reduction operation and the second video noise reduction operation, for example, by the block grid detection unit 1402, the horizontal block edge detection and limit determination unit 1404 and/or the vertical block edge detection and limit determination unit 1406.

The results from one or both of the first video noise reduction operation and the second video noise reduction operation may be determined based on one or more of: selecting a weakest filter correction from a median filter and one or more linear filters, blending filter corrections from a median filter and one or more linear filters and selecting a strongest filter correction from a median filter and one or more linear filters. Horizontal spacing of a block noise grid, vertical spacing of a block noise grid, horizontal shift of a block noise grid, vertical shift of a block noise grid and/or block noise strength may be determined during one or both of the first video noise reduction operation and the second video noise reduction operation. Determination of which pixels to filter in a picture, may be based on one or more of the horizontal spacing, the vertical spacing, the horizontal shift and the vertical shift. Vertical and/or horizontal block noise filters, for example, 1410 and 1408, may be configured based on one or more of the horizontal direction scale, the vertical direction scale, the horizontal spacing and the vertical spacing.

Filter corrections may be limited based on block noise strength when determining the results from the first video noise reduction operation and/or the results from the second video noise reduction operation, for example, by the HBNR filter 1408 and/or the VBNR filter 1410. In this manner, digital noise may be reduced in scaled compressed video pictures, for example, when video pictures are scaled after being compressed.

In another embodiment of the invention, a number of filter taps utilized and/or filter coefficient values may be controlled based on the scale, for example, by the horizontal block edge detection and limit determination unit 1404 and/or the vertical block edge detection and limit determination unit 1406.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for digital noise reduction of scaled compressed video pictures.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing in a video processing device, the method comprising:

detecting, in a video image, a scale factor by which said video image has been scaled from a native resolution of said video image in one or both of vertical or horizontal directions based on pixel information for said video image;

controlling, based on said scale factor, one or both of a first video noise reduction operation or a second video noise reduction operation, which are utilized for processing at least a portion of said video image;

generating a pixel correction value based on one or both of results from said first video noise reduction operation or results from said second video noise reduction operation; and determining said scale factor by which said video image has been scaled from said native resolution based on one or both of a per pixel vertical gradient measurement or a per pixel horizontal gradient measurement, wherein when determining said scale factor, determining which gradient measurements to utilize or which gradient measurements to discard is based on one or more of:

configured picture format information associated with said video image;

standard deviation of luma levels in one or both of a vertical window or a horizontal window about a current pixel of said video image; and a current pixel location relative to at least one of edges of black borders, graphics, or overlaid content associated with said video image.

2. The method according to claim 1, comprising blending said results from said first video noise reduction operation and said results from said second video noise reduction operation to generate said pixel correction value.

3. The method according to claim 1, comprising correcting at least one pixel value for said video image utilizing said pixel correction value.

4. The method according to claim 1, wherein said first video noise reduction operation and said second video noise reduction operation comprise mosquito noise reduction and block noise reduction, respectively.

5. The method according to claim 1, further comprising during one or both of said first video noise reduction operation or said second video noise reduction operation, performing horizontal operations, which correspond to said horizontal direction, separately from performing vertical operations, which correspond to said vertical direction, for one or more operations comprising:

detecting horizontal and vertical edges;
determining strength of horizontal and vertical edges;
filtering horizontal and vertical edges;
adapting at least one of horizontal filtering or vertical filtering based on at least one of a horizontal direction scale or a vertical direction scale; and
adapting at least one of said horizontal filtering or said vertical filtering based on said strength of said horizontal and vertical edges.

6. The method according to claim 1, further comprising determining one or both of said results from said first video noise reduction operation or said results from said second video noise reduction operation, based on one or more of:

selecting a weakest filter correction from at least one of a median filter or one or more linear filters;
blending filter corrections from at least one of said median filter or said one or more linear filters; and
selecting a strongest filter correction from at least one of said median filter or said one or more linear filters.

7. The method according to claim 1, further comprising one or more of:

determining at least one of a horizontal spacing of a block noise grid, a vertical spacing of said block noise grid, a horizontal shift of said block noise grid, a vertical shift of said block noise grid, or a block noise strength;

determining where to filter pixels in a picture based on one or more of said horizontal spacing, said vertical spacing, said horizontal shift, or said vertical shift; and
configuring at least one of vertical or horizontal block noise filters based on one or more of a horizontal direction scale, a vertical direction scale, said horizontal spacing, or said vertical spacing, during one or both of said first video noise reduction operation or said second video noise reduction operation.

8. The method according to claim 1, further comprising limiting filter corrections based on block noise strength when determining said results from said first video noise reduction operation or said results from said second video noise reduction operation.

9. A system comprising:

one or more processors, one or more circuits, or any combination thereof for use in a video processing device and being operable to:

detect, in a video image, a scale factor by which said video image has been scaled from a native resolution of said video image in one or both of vertical or horizontal directions based on pixel information for said video image;

control, based on said scale factor, one or both of a first video noise reduction operation or a second video noise reduction operation, which are utilized for processing at least a portion of said video image; and generate a pixel correction value based on one or both of results from said first video noise reduction operation or results from said second video noise reduction operation, wherein said one or more processors, one or more circuits, or any combination thereof is operable to determine said scale factor by which said video image has been scaled from said native resolution based on one or both of a per pixel vertical gradient measurement or a per pixel horizontal gradient measurement, and wherein, when determining said scale factor, said one or more processors, one or more circuits, or any combination thereof is operable to determine which gradient measurements to utilize or which gradient measurements to discard, based on one or more of:

configured picture format information associated with said video image;

standard deviation of luma levels in one or both of a vertical window or a horizontal window about a current pixel of said video image; and a current pixel location relative to at least one of edges of black borders, graphics, or overlaid content associated with said video image.

10. The system according to claim 9, wherein said one or more processors, one or more circuits, or any combination thereof is operable to correct at least one pixel value for said video image utilizing said pixel correction value.

11. The system according to claim 9, wherein said first video noise reduction operation and said second video noise reduction operation comprise mosquito noise reduction and block noise reduction, respectively.

12. The system according to claim 9, wherein said one or more processors, one or more circuits, or any combination thereof is operable to blend said results from said first video noise reduction operation and said results from said second video noise reduction operation to generate said pixel correction value.

13. The system according to claim 9, wherein said one or more processors, one or more circuits, or any combination thereof is operable, during one or both of said first video noise reduction operation or said second video noise reduction operation, to perform horizontal operations, which correspond to said horizontal direction, separately from performing vertical operations, which correspond to said vertical direction, for one or more operations comprising:
  detecting horizontal and vertical edges;
  determining strength of horizontal and vertical edges;
  filtering horizontal and vertical edges;
  adapting at least one of horizontal filtering or vertical filtering based on at least one of a horizontal direction scale or a vertical direction scale; and
  adapting at least one of said horizontal filtering or said vertical filtering based on said strength of said horizontal and vertical edges.

14. The system according to claim 9, wherein said one or more processors, one or more circuits, or any combination thereof is operable to determine one or both of said results from said first video noise reduction operation or said results from said second video noise reduction operation, based on one or more of:
  selecting a weakest filter correction from at least one of a median filter or one or more linear filters;
  blending filter corrections from at least one of said median filter or said one or more linear filters; and
  selecting a strongest filter correction from at least one of said median filter or said one or more linear filters.

15. The system according to claim 9, wherein said one or more processors, one or more circuits, or any combination thereof is operable to:
  determine at least one of a horizontal spacing of a block noise grid, a vertical spacing of said block noise grid, a horizontal shift of said block noise grid, a vertical shift of said block noise grid, or a block noise strength;
  determine where to filter pixels in a picture based on one or more of said horizontal spacing, said vertical spacing, said horizontal shift, or said vertical shift; and
  configure at least one of vertical or horizontal block noise filters based on one or more of a horizontal direction scale, a vertical direction scale, said horizontal spacing, or said vertical spacing, during one or both of said first video noise reduction operation or said second video noise reduction operation.

16. The system according to claim 9, wherein said one or more processors, one or more circuits, or any combination thereof is operable to limit filter corrections based on block noise strength when determining said results from said first video noise reduction operation or said results from said second video noise reduction operation.

17. A method for image processing, the method comprising:
  determining, by a video processing device, a scale factor from a native resolution of a video image based on one or both of a per pixel vertical gradient measurement or a per pixel horizontal gradient measurement;
  when determining said scale factor, determining which gradient measurements to utilize or which gradient measurements to discard, based on one or more of:
  configured picture format information associated with said video image;
  a standard deviation of luma levels in one or both of a vertical window or a horizontal window about a current pixel of said video image; and
  a current pixel location relative to at least one of edges of black borders, graphics, or overlaid content associated with said video image;
  controlling, based on said scale factor, one or both of a first video noise reduction operation or a second video noise reduction operation; and
  generating a pixel correction value by blending results from said first video noise reduction operation and results from said second video noise reduction operation.

18. The method according to claim 17, wherein said first video noise reduction operation and said second video noise reduction operation comprise mosquito noise reduction and block noise reduction, respectively.

* * * * *